US008644565B2

(12) United States Patent
Du et al.

(10) Patent No.: US 8,644,565 B2
(45) Date of Patent: Feb. 4, 2014

(54) SYSTEM AND METHOD FOR NON-COOPERATIVE IRIS IMAGE ACQUISITION

(75) Inventors: Eliza Yingzi Du, Indianapolis, IN (US); Zhi Zhou, Indianapolis, IN (US); Emrah Arslanturk, Greenwood, IN (US)

(73) Assignee: Indiana University Research and Technology Corp., Indianapolis, IN (US)

( * ) Notice: Subject to any disclaimer, the term of this patent is extended or adjusted under 35 U.S.C. 154(b) by 363 days.

(21) Appl. No.: 13/055,250

(22) PCT Filed: Jul. 22, 2009

(86) PCT No.: PCT/US2009/051452
§ 371 (c)(1),
(2), (4) Date: Feb. 25, 2011

(87) PCT Pub. No.: WO2010/011785
PCT Pub. Date: Jan. 28, 2010

(65) Prior Publication Data
US 2011/0150334 A1    Jun. 23, 2011

Related U.S. Application Data

(60) Provisional application No. 61/083,034, filed on Jul. 23, 2008, provisional application No. 61/083,628, filed on Jul. 25, 2008.

(51) Int. Cl.
*G06K 9/00* (2006.01)
(52) U.S. Cl.
USPC ............ 382/118; 382/103; 382/115; 382/254
(58) Field of Classification Search
USPC .................................. 382/103, 115, 254, 284
See application file for complete search history.

(56) References Cited

U.S. PATENT DOCUMENTS 5,291,560 A * 3/1994 Daugman ..................... 382/117
5,481,622 A    1/1996 Gerhardt et al.
(Continued)

FOREIGN PATENT DOCUMENTS

WO    WO 99/25239 A1    5/1999

OTHER PUBLICATIONS

International Searching Authority; International Search Report for PCT/US2009/051452; Mailed Nov. 20, 2009 (6 pages).

(Continued)

*Primary Examiner* — Vu Le
*Assistant Examiner* — Aklilu Woldemariam
(74) *Attorney, Agent, or Firm* — Maginot, Moore & Beck, LLP

(57) ABSTRACT

A method segments iris images from eye image data captured from non-cooperative subjects. The method includes receiving a frame of eye image data, and determining whether a pupil exists in the image by detecting glare areas in the image. Upon finding a pupil, subsequent images are processed with reference to the pupil location and a radius is calculated for the pupil. A k means clustering method and principal component analysis are used to locate pupil boundary points, which are fitted to a conic. Using the pupil boundary, an angular derivative is computed for each frame having a pupil and iris boundary points are fitted to a conic to identify an iris region between the iris boundary and the pupil boundary. Noise data are then removed from the iris region to generate an iris segment. A method for evaluating iris frame quality and iris image segmentation quality is also disclosed.

24 Claims, 19 Drawing Sheets

(56) References Cited

U.S. PATENT DOCUMENTS

| | | | |
|---|---|---|---|
| 5,572,596 A * | 11/1996 | Wildes et al. | 382/117 |
| 5,835,639 A * | 11/1998 | Honsinger et al. | 382/278 |
| 6,005,983 A | 12/1999 | Anderson et al. | |
| 6,026,174 A * | 2/2000 | Palcic et al. | 382/133 |
| 6,120,461 A | 9/2000 | Smyth | |
| 6,526,160 B1 * | 2/2003 | Ito | 382/117 |
| 6,639,628 B1 | 10/2003 | Lee et al. | |
| 6,714,665 B1 * | 3/2004 | Hanna et al. | 382/117 |
| 7,123,751 B1 | 10/2006 | Fujieda | |
| 8,014,571 B2 * | 9/2011 | Friedman et al. | 382/117 |
| 2003/0223037 A1 * | 12/2003 | Chernyak | 351/209 |
| 2004/0174496 A1 | 9/2004 | Ji et al. | |
| 2004/0184670 A1 | 9/2004 | Jarman et al. | |
| 2006/0038892 A1 | 2/2006 | Zanzucchi et al. | |
| 2006/0093998 A1 | 5/2006 | Vertegaal | |
| 2006/0098867 A1 * | 5/2006 | Gallagher | 382/167 |
| 2006/0147094 A1 * | 7/2006 | Yoo | 382/117 |
| 2006/0161141 A1 | 7/2006 | Chernyak | |
| 2006/0280249 A1 | 12/2006 | Poon | |
| 2007/0135999 A1 | 6/2007 | Kolatt | |
| 2007/0153233 A1 | 7/2007 | Campin et al. | |
| 2007/0189582 A1 * | 8/2007 | Hamza et al. | 382/117 |
| 2007/0262574 A1 | 11/2007 | Breed et al. | |
| 2008/0253622 A1 * | 10/2008 | Tosa et al. | 382/117 |

OTHER PUBLICATIONS

International Searching Authority; Written Opinion of the International Searching Authority for PCT/US2009/051452; Mailed Nov. 20, 2009 (7 pages).

* cited by examiner

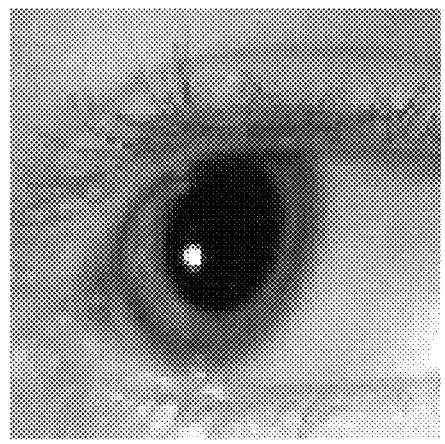
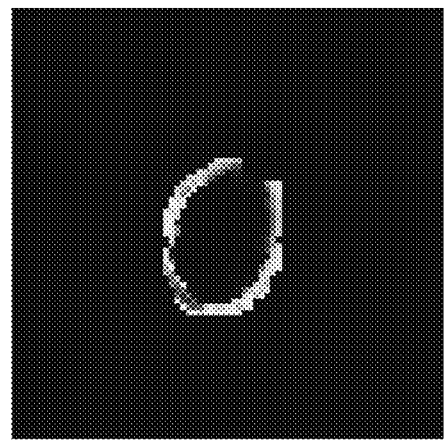
FIG. 5A    FIG. 5B
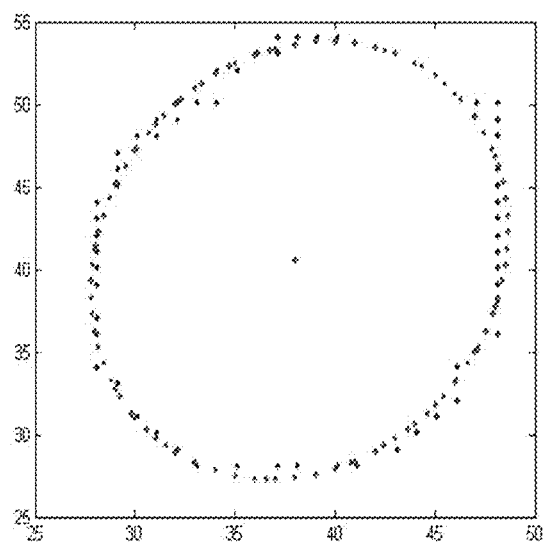
FIG. 6

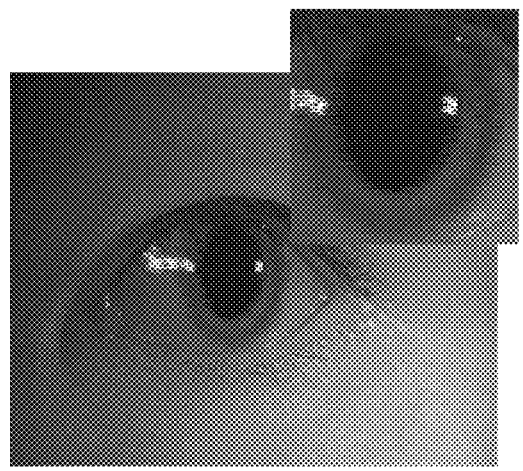
FIG. 18A
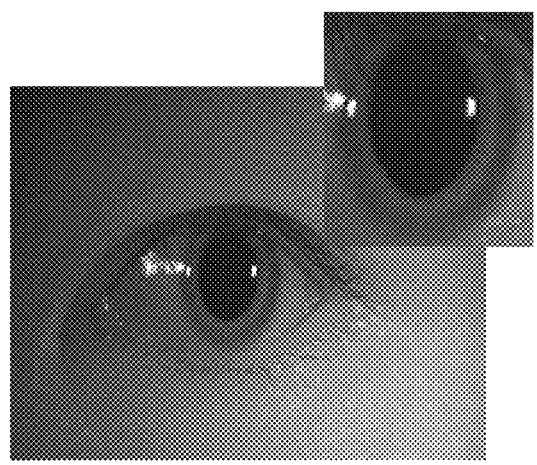 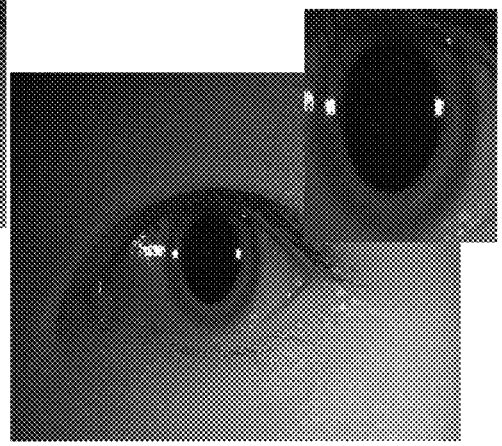
FIG. 18B   FIG. 18C

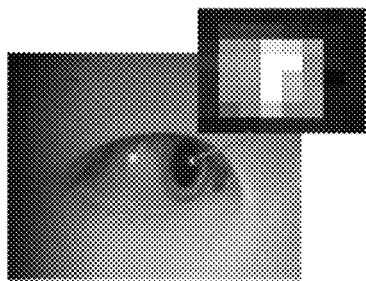 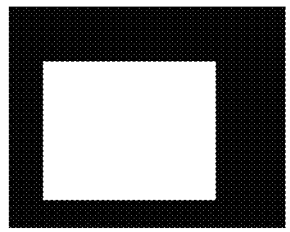 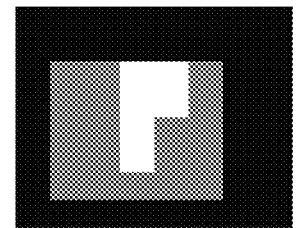
FIG. 30A						FIG. 30B						FIG. 30C
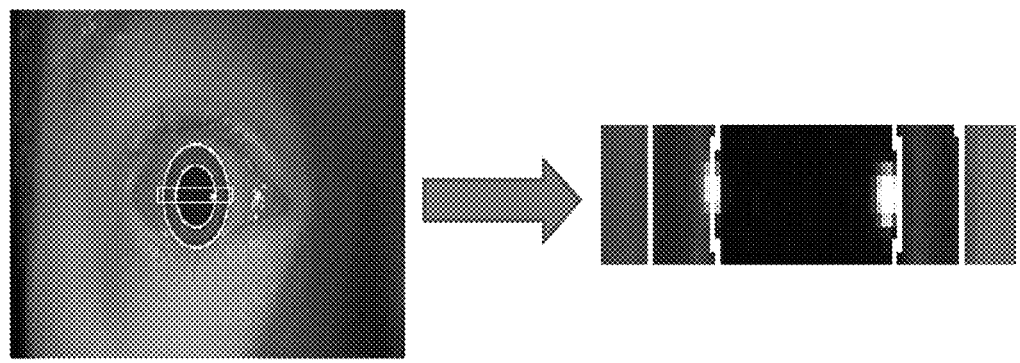
FIG. 31
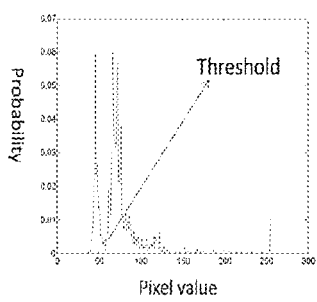 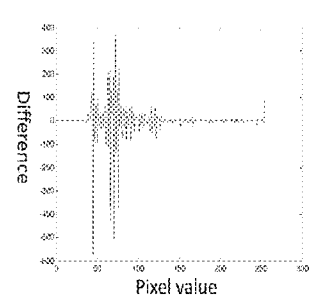 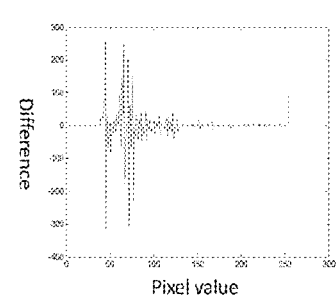
FIG. 32A						FIG. 32B						FIG. 32C

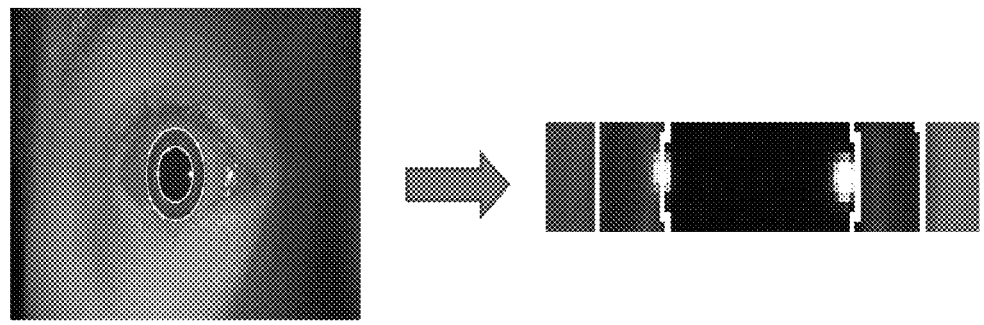
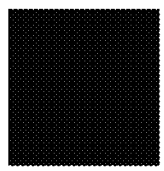 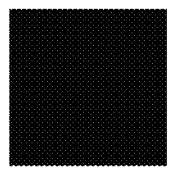 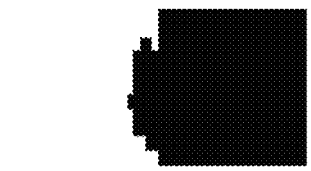
FIG. 33A
FIG. 33B　　　　　　　　　　　FIG. 33C
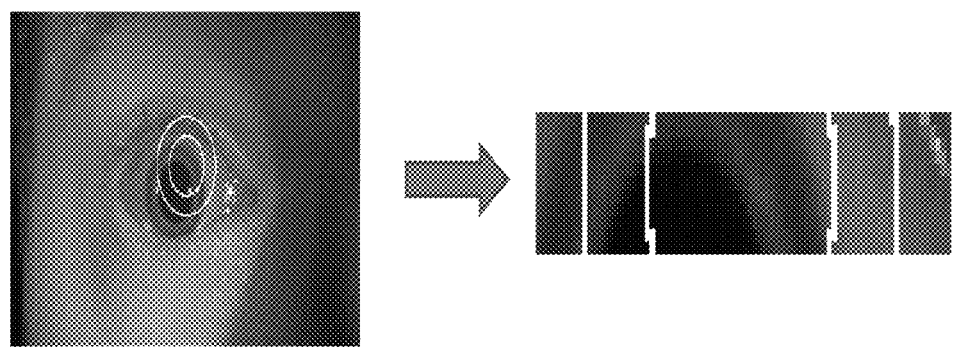
FIG. 34A
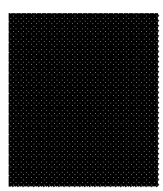 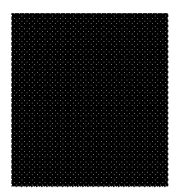 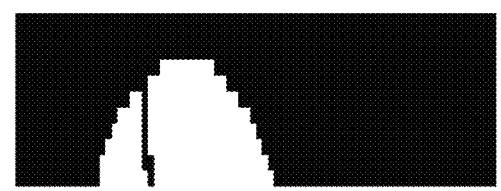
FIG. 34B　　　　　　　　　　　FIG. 34C

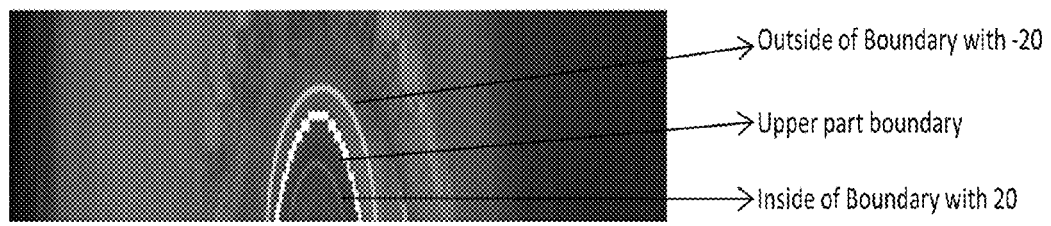
FIG. 35
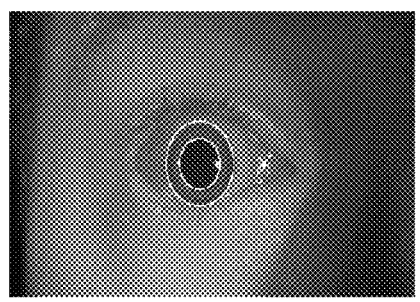 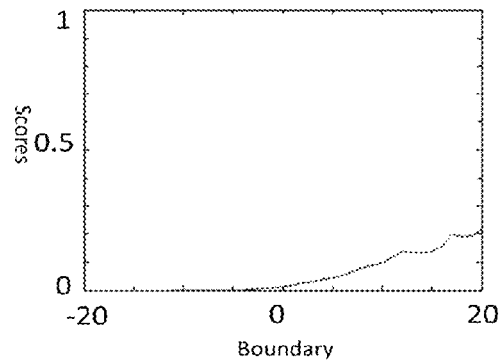
FIG. 36A          FIG. 36B
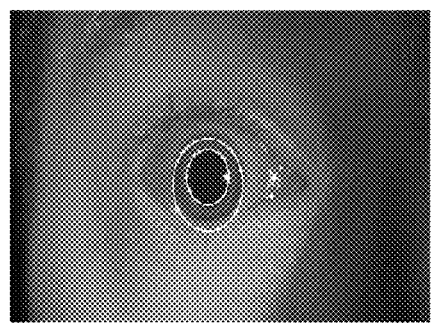 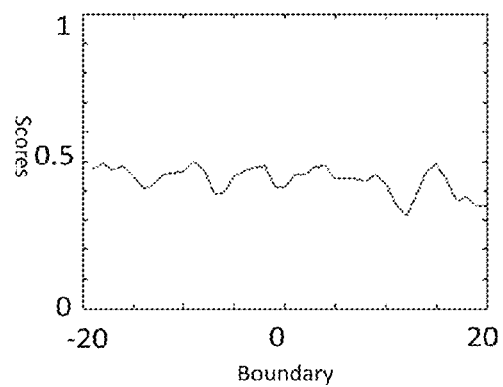
FIG. 37A          FIG. 37B

SYSTEM AND METHOD FOR NON-COOPERATIVE IRIS IMAGE ACQUISITION

This application claims priority from International Application PCT/US09/51452, which is entitled "System And Method For A Non-Cooperative Iris Image Acquisition System," and was filed on Jul. 22, 2009. This application further claims priority to U.S. Provisional Patent Application 61/083,034, which was filed on Jul. 23, 2008 and entitled "System And Method For Iris Segmentation In A Non-Cooperative Iris Image Acquisition System," and to U.S. Provisional Patent Application 61/083,628, which was filed on Jul. 25, 2008 and entitled "System And Method For Evaluating Frame Quality And Iris Image Segmentation Quality In A Non-Cooperative Iris Image Acquisition System."

STATEMENT REGARDING GOVERNMENT FUNDED RESEARCH

This invention was made with government support under contract N00014-07-1-0788 awarded by the Office of Naval Research. This invention was made with government support under contract 2007-DE-BX-K182 awarded by the National Institute of Justice. The government has certain rights in the invention.

TECHNICAL FIELD

The system and method disclosed below relate to personal identification through facial feature recognition, and specifically, to personal identification through iris identification.

BACKGROUND

Systems for identifying persons through intrinsic human traits have been developed. These systems operate by taking images of a physiological trait of a person and comparing information stored in the image to data that corresponds the trait for a particular person. When the information stored in the image has a high degree of correlation to the relevant data previously obtained a particular person's trait, a person can be positively identified. These biometric systems obtain and compare data for physical features, such as fingerprints, voice, and facial characteristics. Different traits impose different constraints on these systems. For example, fingerprint recognition systems require the person to be identified to contact an object directly for the purpose of obtaining fingerprint data from the object. Facial feature recognition systems, however, do not require direct contact with a person and these biometric systems are capable of capturing identification data without the cooperation of the person to be identified.

One trait especially suited for non-cooperative identification is an iris pattern in a person's eye. The human eye iris provides a unique trait that changes little over a person's lifetime. For cooperative iris recognition, the person to be identified is aware of an image being taken and the captured image is a frontal view of the eye. Non-cooperative iris image capture systems, on the other hand, obtain an iris image without a person's knowledge of the data capture. Thus, the subject's head is likely moving and his or her eyes are probably blinking during iris image acquisition. Consequently, the captured image is not necessarily a frontal view of the eye.

Identification of a person from an iris image requires iris image segmentation. Segmentation refers to the relative isolation of the iris in the eye image from the other features of an eye or that are near an eye. For example, eyelashes and eyelids are a portion of an eye image, but they do not contribute to iris information that may be used to identify a person Likewise, the pupil does not provide information that may be used to identify a person. Consequently, effective segmentation to locate the portions of a captured eye image that contain iris pattern information is necessary for reliable identification of person. Because previously known iris identification systems rely upon the acquisition of eye images from cooperative subjects, iris segmentation techniques have focused on frontal eye images. What is needed is a more robust method of iris segmentation to identify correctly those portions of an eye image that contain iris pattern data in an eye image obtained from a non-cooperative eye image acquisition system.

To address some of the issues related to the capture of quality eye images in a non-cooperative environment, video-based methods of image acquisition have been used. Multiple frames of eye image data provide more information that is useful for overcoming limitations present in a non-cooperative environment. All frames of eye image data, however, are not useful for identification purposes. For example, some frames may be out of focus, or contain low contrast images. Additionally, movement of the subject's head or eyes may result in the image of a closed eye from blinking or no eye at all because the subject turned his or her head. These problems with frame data require that the quality of the image data and the accuracy of the segmentation be verified. Otherwise, recognition accuracy may be drastically reduced. Previously known image quality assessment methods, unfortunately, are directed to individual iris images and do not adequately evaluate image data on a frame basis in a video sequence. Additionally, no methods for iris segmentation evaluation are currently known. Thus, development of image quality assessment methods for video frame data of eye images and segmentation evaluation methods is desirable.

SUMMARY

A method segments iris images from frames of eye image data captured from non-cooperative subjects for a biometric identification system. The method includes receiving a frame of eye image data, and determining whether a pupil exists in the image by detecting glare areas in the image. Upon finding a pupil, subsequent images are processed with reference to the pupil location and radius calculated for the pupil in the first frame in which a pupil was located. A k means clustering method and principal component analysis with basis vector calculations are used to locate pupil boundary points. These points are fitted to a conic, which is preferably an ellipse. Using the pupil boundary, an angular derivative is computed of the eye image data in each frame having a pupil and iris boundary points are identified. These iris boundary points are fitted to a conic to identify the iris region as being between the iris boundary and the pupil boundary. Noise data are then removed from the iris region to generate an iris segment for further identification processing.

A method for use in a non-cooperative environment provides a quality score for video frame data of eye images and a segmentation score for an iris segmentation. The method includes generating a quality score for frames in a video sequence of eye images, discarding frames from the video sequence for segmentation processing in response to the quality score for a frame being less than a threshold, and generating a segmentation score for iris segmentations generated by the segmentation processing. The quality scores are used to eliminate frames from iris segmentation processing that may be blurred, out of focus, or without an image of an eye having an iris image. The segmentation score indicates the accuracy of the pupil boundary and center as well as the iris boundary location.

BRIEF DESCRIPTION OF THE DRAWINGS

FIG. 5A is an image of eye.

FIG. 5B is a gradient of a region of interest in the image shown in FIG. 5A.

FIG. 6 shows fitted ellipse pupil boundary points over detected pupil boundary points.

FIG. 18A shows an example of an interlaced frame composed of a portion of the frame shown in FIG. 18B and a portion shown from a later frame in FIG. 18C.

FIG. 30A is a blurred eye image with a glare area and FIG. 30B is the glare area as a bright object obtained with one threshold and FIG. 30C is the glare area as a background object with a gray area that is obtained with a second threshold.

FIG. 31 is an eye image with an iris segmentation imposed on the image and a horizontal rectangle cut from the segmentation for evaluation of the segmentation.

FIG. 32A is a histogram of the horizontal rectangle and FIG. 32B and FIG. 32C are differences between the pupil histogram and the iris histogram.

FIG. 33A is an image with a good segmentation and the rectangle used to evaluate the segmentation.

FIG. 33B and FIG. 33C show the mask from segmentation matches the mask from pupil boundary detection well.

FIG. 34A is an image with a poor segmentation and the rectangle used to evaluate the segmentation.

FIG. 34B and FIG. 34C show the mask from segmentation matches the mask from pupil boundary detection poorly.

FIG. 35 depicts an example of checking an upper boundary of an iris segmentation.

FIG. 36A depicts a good iris segmentation and FIG. 38B illustrates its homogeneous score.

FIG. 37A depicts a bad iris segmentation and FIG. 37B illustrates its homogeneous score.

DETAILED DESCRIPTION

Figure 1:
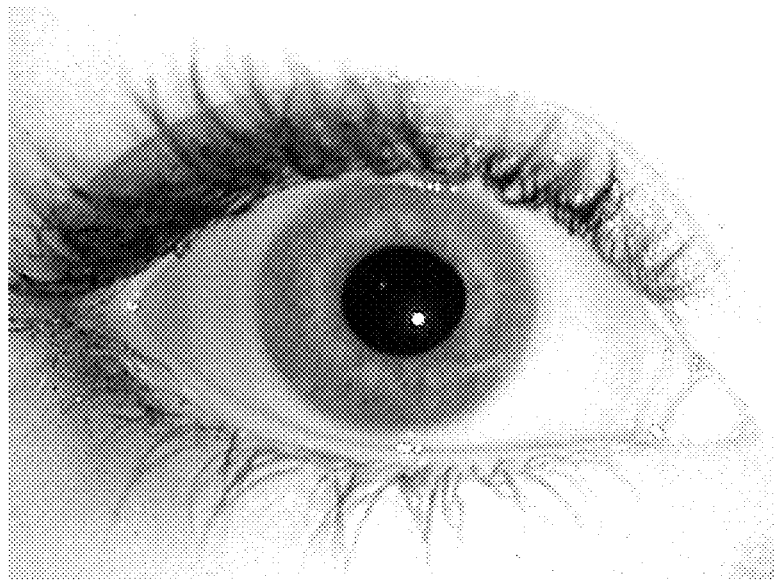
FIG. 1 is an image of a human eye taken by a cooperative eye image acquisition system.
Figure 2:
FIG. 2 is an image of a human eye obtained by a non-cooperative image acquisition system.
Figure 3A:
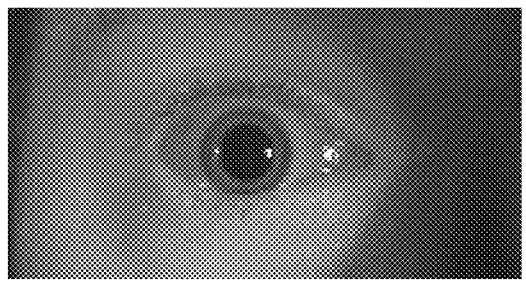
FIG. 3A is an image of a human eye taken by a biometric identification system for glare detection.
Figure 3B:
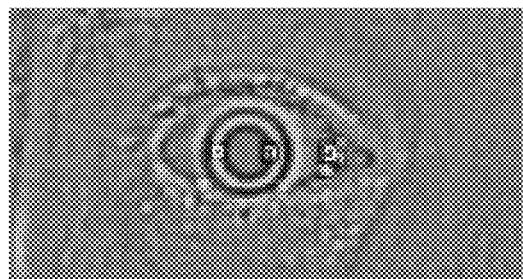
FIG. 3B is a depiction of the data received from FIG. 1A and stored for glare detection in a biometric identification system.

In a non-cooperative eye image acquisition system, the captured images are not necessarily useful for personal identification. For example, FIG. 1 shows a frontal eye image obtained through a cooperative eye image system. This image clearly provides a frontal view of the iris with the eye sufficiently open that little occlusion of the iris occurs. In contrast, FIG. 2 shows an example of an image that was obtained from a non-cooperative eye image acquisition system. In this image, the subject's eyes are practically closed so processing of the image for iris segmentation would be futile. Consequently, a method of iris segmentation using frames of eye image data captured by a non-cooperative image acquisition system begins by determining whether a frame of eye image data has the potential for iris segmentation.

To evaluate a frame of eye image data, a test for glare detection is performed. The basis for attempting to detect glare is the assumption that an image eye of a relatively open eye not obscured by motion blur contains glare. This correlation is demonstrated in FIG. 1A and FIG. 1B. FIG. 1A is the image of a human eye and FIG. 1B shows peak points that indicate glare. The peak points shown in FIG. 1B confirm that the image is a candidate for iris segmentation. Glare detection begins by convolving a specific mask H with the original image and the output is compared to a threshold to evaluate glare in the eye.

$$H = \begin{bmatrix} -2 & -2 & -2 & -2 & -2 \\ -2 & 3 & 3 & 3 & -2 \\ -2 & 3 & 8 & 3 & -2 \\ -2 & 3 & 3 & 3 & -2 \\ -2 & -2 & -2 & -2 & -2 \end{bmatrix}$$

If the output shows peak points in the image, then image processing for segmentation is continued, however, if no peak points are present, the image is discarded. Once a frame is deemed acceptable for processing, iris segmentation begins. Iris segmentation is a process in which unnecessary information in the eye image is removed so the region of interest in the image becomes smaller. This culling of the eye image helps improve processing speed for the iris segmentation process. For the images of the human eye that underwent glare detection, a clustering algorithm is used to identify the coarse location of the pupil in the image. Clustering is performed with a K-means clustering algorithm in which K represents the number of clusters, which are characterized by their centroids. A principal component analysis and unit vector calculation, described in more detail below, are only applied on the first frame in which a pupil exists.

In more detail, the clusters are determined by minimizing the sum of the squared error.

$$J_k = \|X_1 - m_k\|^2$$

where $$m_k = \frac{1}{n_k} \sum_{k=1}^{K} x_k$$

is the centroid of class $C_k$, $n_k$ is the number of elements in class $C_k$, and $x_i$ is the input data. $\|X\|_2$ is the two norm of x. The equation above finds the distance between the input data to each cluster and classifies the input data to the closest cluster.

$$C_1 k = \min k\{J_1 k\}, k=1, \ldots, K$$

where K is the number of classes. After data is classified to a cluster, the cluster should be updated, where the centroid of the cluster is recalculated with the new information.

$$m_k^{new} = \frac{[(n)_k^{old} * m_k^{old} + x_i)]}{n_k^{old} + 1}$$

After the centroid of the cluster is updated, the number of elements of the cluster is incremented by one. The centroid of the clusters is updated as the iterations progress through the enrollment data.

Principal Component Analysis (PCA) is an orthogonal linear transformation of given data to a new coordinate system according to a variance of the projection of the data. PCA is used to reduce the dimensions of the cluster by picking out the dimensions with the largest variances, which means finding the best low rank approximation of the data by minimizing the least squares.

First, the mean of cluster centers is found.

$$\overline{m} = \frac{1}{N} \sum_k m_k$$

The sample mean is a zero-dimensional representation of the clustered data. By projecting the data onto a line passing through the sample mean, we obtain:

$$x_k = \overline{m} + \alpha_k e$$

where e is a unit vector in the direction of the line and $\alpha_k$ is a scalar corresponding to the distance of $x_k$ to $\overline{m}$. By minimizing the squared-error, an optimal set of $\alpha_k$ can be found.

$$J_L(\alpha_1, \ldots, \alpha_n, e) = \sum_{k=1}^{n} \|(\overline{m} + a_k e) - x_k\|^2$$

$$J_L = \sum_{k=1}^{n} a_k^2 \|e\|^2 - 2 \sum_{k=1}^{n} a_k e^T (x_k - \overline{m}) + \sum_{k=1}^{n} \|x_k - \overline{m}\|^2$$

The norm of unit vector e is equal to 1. The partial derivative of the previous equation with respect to $\alpha_k$ is:

$$\frac{\partial J}{\partial a_k} = 2a_k - 2e^t(x_k - \overline{m})$$

To minimize the least squared error, the derivative of the error criterion function should be zero. When the last equation is set to zero, we obtain, $$\alpha_k = e^\tau (X_k - \overline{m})$$

This equation provides the least squares solution of $x_k$ projected onto the line passing through the sample mean in the direction of e. For finding the optimum direction e, a scatter matrix S is defined as, $$S = \sum_{k=1}^{n} (x_k - \overline{m})[(x)_k - \overline{m}]^T.$$

By substituting the two previous equations into the last equation, we can rewrite the squared error criterion function as, $$J_L(e) = -e^T S e + \sum_{k=1}^{N} \|x_k - \overline{m}\|^2$$

By using Lagrange multipliers method, $e^T S e$ can be maximized subject to the constraint $\|e\|=1$, $$u = e^T S e - \lambda(e^T e - 1)$$

where $\lambda$ is the undetermined Lagrange multiplier. After partially differentiating this equation with respect to e, and setting the derivative to zero, we obtain, $$Se = \lambda e.$$

In order to maximize $e^T S e$, the eigenvectors corresponding to the largest eigenvalues of the scatter matrix should be selected. In this way, the best one-dimensional projection of the data in a least-sum-of-squared-error sense can be found. Then the d' dimensional projection of the clustered data can be rewritten as, $$x = \overline{m} + \sum_{i=1}^{d'} a_i e_i$$

where $e_i$ for $i=1, \ldots$, are the d' eigenvectors of the scatter matrix corresponding to the largest eigenvalues, and the coefficients $\alpha_i$ for $i=1, \ldots d'$ are the principal components of x in the basis of e.

Figure 4:
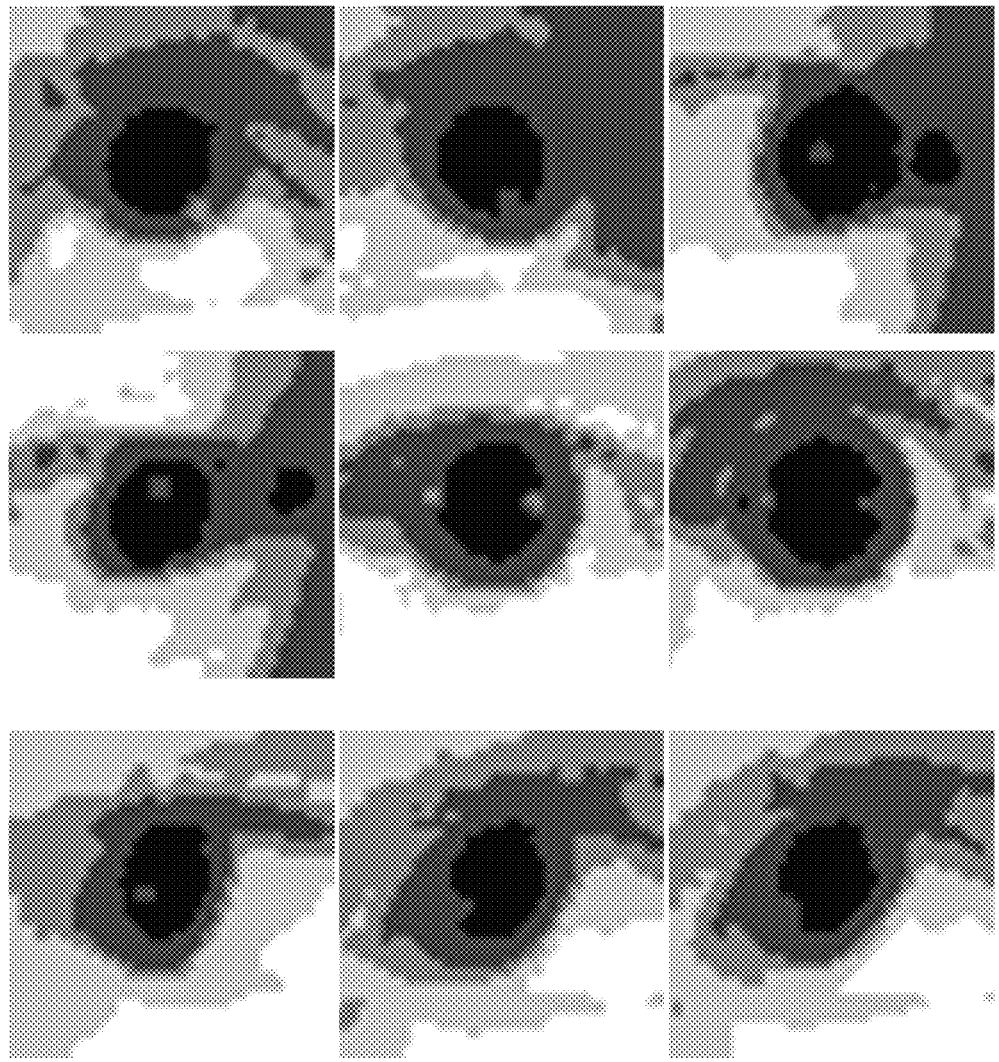
FIG. 4 is a sequence of eye image frames following cluster analysis.

The clustering method described above is applied to a frame of eye image data to find dark regions of the image, one of which may be a pupil. For application of the K-means clustering, each pixel is clustered into 5 classes according to the intensity values of the 8 pixels immediately adjacent to a selected pixel. Only for the first frame in which a pupil is detected are the PCA and basis vectors calculated as well. For subsequent frames, the clustering is performed using the calculated means of the clustered data ($m^-$), the principal components ($\alpha_1 t$), and the basis vectors of projected eigen-space ($e_1 t$). An example of a sequence of clustered frames is shown in FIG. 4.

After clustering a frame, previously detected glare areas are removed from the clustered image and an edge detection algorithm is applied on the first cluster. In order to increase the coarse pupil detection method's efficiency, two different boundary detection methods are proposed according to the condition of the previous frame. Because each frame of a video sequence is in an order, the pupil location cannot change dramatically in two consecutive frames. If the pupil is found in the previous frame, the pupil boundary points are searched around the previous pupil center. For each angle, the search is applied on a radial axis until an edge is found. Because the glare area has already been removed, the first edges around the previous pupil center are assumed to belong to the current pupil boundary. The average of the detected pupil boundary points on the clustered image is assigned as the coarse pupil location.

On the other hand, if the pupil could not be found in the previous frame, then the edge map is filtered with a circular mask, and the highest convolution point is assigned as the coarse pupil location. The circular mask is created for different radius values and normalized. In order to increase the speed of the filtering process, the radius values are limited by using previously detected pupil radius values.

After the coarse pupil location is found, the Euclidean distance between the pupil location and the glare points are calculated. As noted above, at least one of the glare points can be assumed to be close to the pupil area. If the distances between the pupil center and glare points are high, then the pupil was not detected correctly, and the current frame is discarded. Otherwise, iris segmentation processing continues to locate the pupil more precisely.

Pupil boundary detection is now discussed in greater detail. FIG. 5A shows an image of an eye. The region of interest in the image is the area around the pupil location. For detecting the pupil boundary points, the gradient of the region of interest is calculated. The gradient for the region of interest for the image shown in FIG. 5A, after the glare region is removed, is depicted in FIG. 5B. After the glare regions are removed from the gradient, the strongest edges around the coarse pupil center are detected by moving along a radial axis for each angle from the center. These boundary points are used to model the pupil as an ellipse. Eye motion changes the orientation of the pupil with respect to the camera axis. Regular circle or ellipse fitting algorithms to locate the pupil boundary are insufficient to model the boundaries of a moving pupil. An ellipse can be formalized in Cartesian coordinates as:

$$\frac{(x-x_0)^2}{r_1^2} + \frac{(y-y_0)^2}{r_2^2} = 1$$

where $r_1$ and $r_2$ are radii corresponding to x and y coordinates respectively. When and $r_1$ and $r_2$ are equal, the equation represents a circle. However, this equation does not model rotation of an ellipse. For frontal iris images, the pupil can be modeled as a perfect circle or ellipse because the pupil rotates very little, if at all, with respect to the camera axis. On the other hand, with non-cooperative iris images, this assumption regarding rotation cannot be used. Each position of the iris, except the center position, creates a rotation of the pupil. In order to model a moving eye, a more complex elliptical model is needed. In the method disclosed herein the direct least square fitting of ellipses method is proposed to model the pupil boundary mathematically. This approach enables: ellipse-specificity, which provides useful results under occlusion; invariance to affine transformation; high robustness to noise; and high computational efficiency.

A general conic can be represented by a second order polynomial;

$$F(\alpha,x) = \alpha \cdot x = ax^2 + bxy + cy^2 + dx + ey + f = 0$$

where $\alpha = [a\ b\ c\ d\ e\ f]^T$ and $x = [x^2\ xy\ y^2\ x\ y\ 1]^T$. This model is for any 2 dimensional elliptical section of a three dimensional conic. The x and y values are the pixel coordinates of the edge points of the pupil boundary. However, a second order polynomial representation assumes the coordinates are in Cartesian coordinates. The pupil boundary coordinates should be normalized before fitting.

A simple constraint applied on the linear least squares problem provides the high efficiency of the ellipse fitting algorithm. The constraint is the discriminant of the roots of the second order polynomial should be equal to 1.

$$b^2 - 4ac = 1$$

This quadratic constraint can be expressed in matrix form as $\alpha^T C \alpha = 1$.

$$C = \begin{bmatrix} 0 & 0 & 2 & 0 & 0 & 0 \\ 0 & -1 & 0 & 0 & 0 & 0 \\ 2 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix}$$

Now the constrained ellipse fitting problem reduces to
minimizing $E = \|D\alpha\|^2$ subject to constrain $\alpha^T C \alpha = 1$,
where the design matrix D is defined as $D = [x_1 x_2 \ldots x_N]^T$.

The direct ellipse-specific fitting algorithm assumes the input is normalized, so the estimated coefficients found from minimizing the least squares are normalized coefficients. Estimated coefficients need to be un-normalized before being applied to the pupil boundary. The fitted ellipse boundary points over detected boundary points can be seen in FIG. 6.

Figure 7:
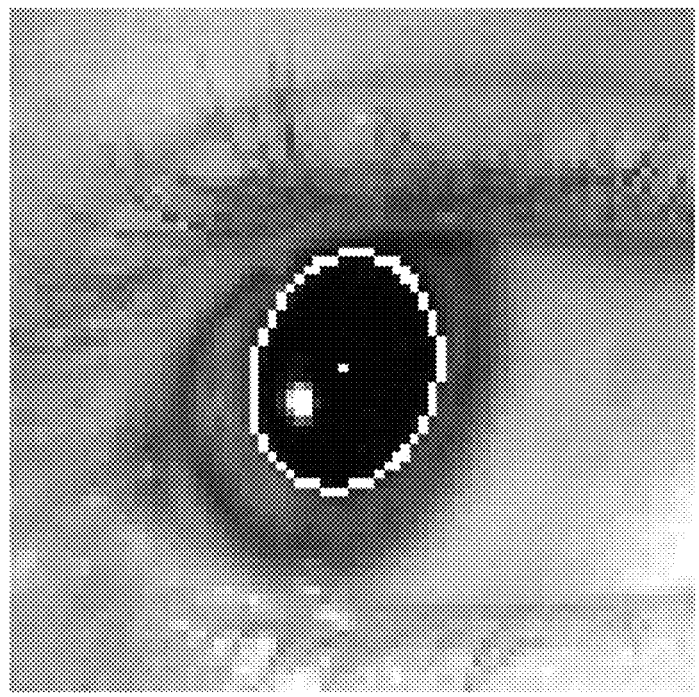
FIG. 7 shows a direct least square fitting of ellipses algorithm for a pupil in an eye image.

The advantage of using the direct least square fitting ellipses method is the robustness of the ellipse fitting algorithm against noisy data, occlusion and rotation. As seen in FIG. 7, by using this method, the effects of occlusion of the pupil with eyelids, the noisy information of eyelashes and glare, and rotation of the eye are minimized. Besides the robustness, the efficiency of the algorithm makes it ideal for video based segmentation. The ellipse fitting algorithm in one embodiment runs under 0.4 milliseconds per frame using Matlab.

After the pupil boundary is modeled and the pupil area is detected, an intensity and variance test is applied to the pupil region to evaluate whether the detected pupil region is correct. The basic assumption is the pupil region should have lower intensity than four neighbors and the variance inside the pupil area should be low after removing the glare region. If the detected pupil area's average intensity is higher than one of four neighbors or the variance inside the detected pupil area is higher than a given threshold, then the frame is discarded. Otherwise, the iris segmentation method continues with processing to detect the iris boundary.

Iris boundary detection and location is similar to pupil boundary detection and location. The iris boundary is almost a perfect circle when the eye is looking to the front. Because there is no muscle controlling the shape of the iris boundary, the radius of the iris boundary only changes with the distance of the camera to the eye. However, for the non-cooperative video frames, the shape of the iris also changes with the motion of the eye. Even if it is almost a perfect circle in a frontal view, the iris boundary has elliptical shape when the eye is looking another direction. The rotation of the eye corresponding to the camera axis creates a projective transformation of the iris boundary.

The same ellipse fitting algorithm is used for modeling the iris boundary. However, finding the iris boundary points is more difficult than finding the pupil boundary points for the pupil. The pupil boundary has stronger edges than the iris boundary, and the occlusion of the eyelids is less for the pupil boundary than it is for the iris boundary. An angular derivative is used instead of the gradient image for detecting the iris boundary points in order to separate vertically strong eyelids and horizontally strong eyelashes from iris boundary points.

$$Ang.Der.(x, y) = \sum_{j=-2}^{2} (D_{j+2}) \cdot Im((x+j) \cdot \cos\theta)((y+j) \cdot \sin\theta)$$

where D=[-2, -1, 0, 1, 2], Im is the original image, x and y are the pixel coordinates and θ is the angle. The iris area has a lower intensity than the sclera area of the eye. Consequently, the signed value of the angular derivative is used rather than the absolute value and only positive values are taken in consideration. The strongest positive angular derivatives, excluding the pupil edge locations, are stored as iris boundary points. The top part of the iris (45° to 135°) is ignored because of severe occlusion of the top eyelid over the iris region.

Figure 8:
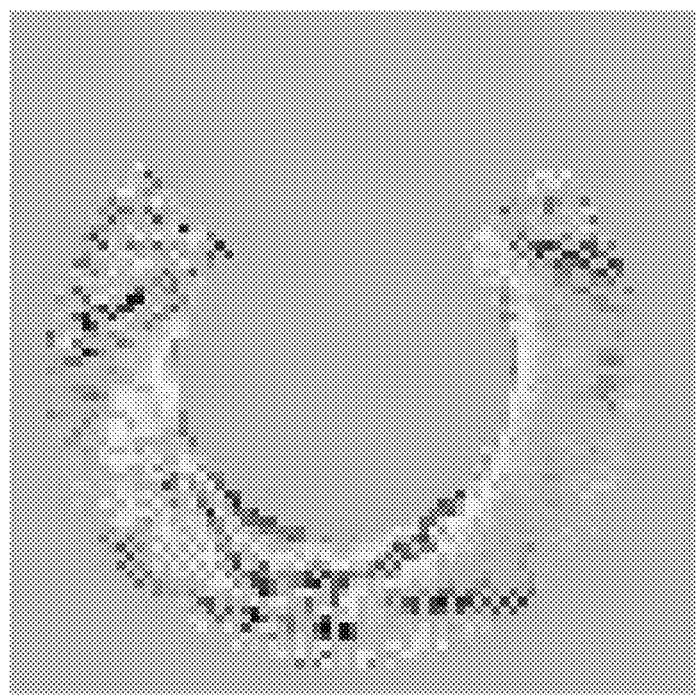
FIG. 8 shows an angular derivative of the original image shown in FIG. 5A after the detected pupil area is removed.
Figure 9:
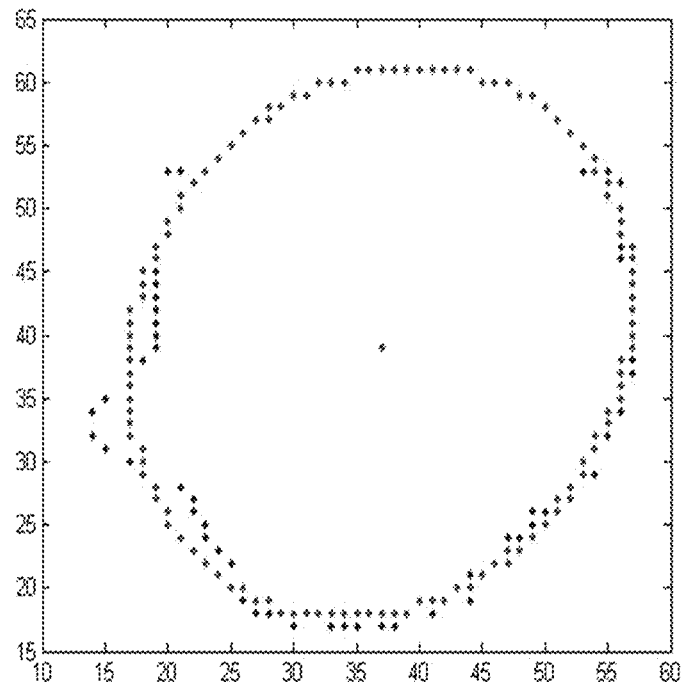
FIG. 9 shows fitted ellipse iris boundary points over detected iris boundary points.
Figure 10:
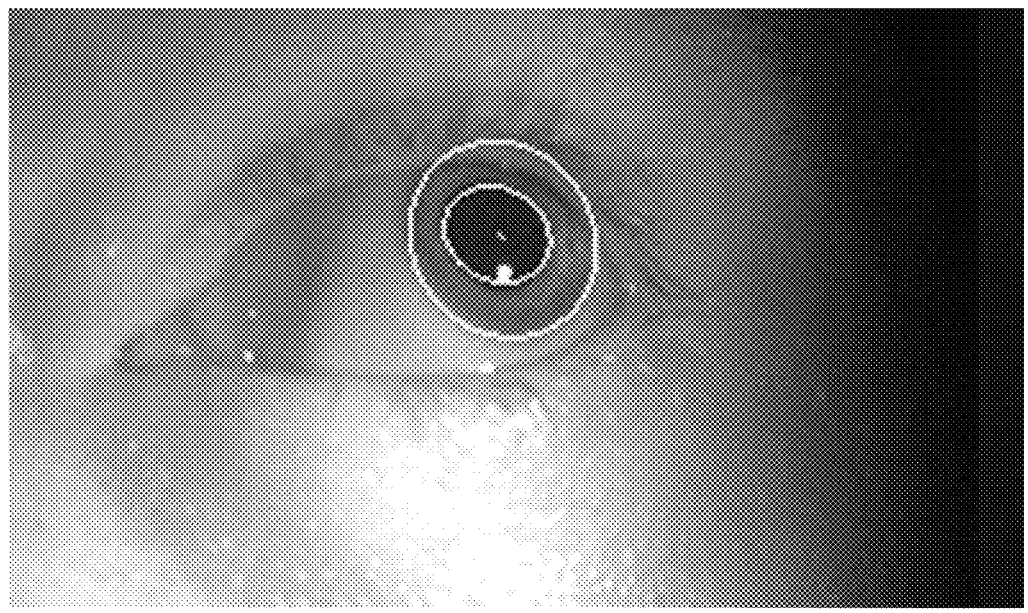
FIG. 10 shows an output of the disclosed iris segmentation method identifying pupil and iris boundaries in an eye image.

The angular derivative of the original image, after removal of the detected pupil region, can be seen in FIG. 8, where the red regions represent the highest angular derivative. As seen in FIG. 9, even though the top part of the iris boundary is ignored during the fitting process and noisy data is still present in the detected iris boundary points, the fitting result is robust and accurate. As seen in FIG. 10, the robustness of the ellipse fitting algorithm against the occlusion helps fit the iris boundary against the eyelids. In order to check the correctness of the iris detection output, the distance between the modeled pupil center and the iris center is calculated. The distance between the centers is assumed to be no greater than a threshold. Otherwise, the current frame is discarded before the noise cancellation stage.

One of the key steps of iris recognition is segmentation of the iris region from the rest of the image accurately. Locating the eye and extracting the pupil and iris boundaries in the image is not trivial for non-cooperative iris video frames. The location and orientation of the eye and occlusion of the eyelids and eyelashes creates non-ideal circumstances for segmentation. By using the robustness of the direct least square ellipse fitting method, the negative effects of occluded and noisy data are minimized and the efficiency of the algorithm makes the proposed method applicable for video based image processing.

After segmenting the iris area from the rest of the frame, the noisy information inside the iris region should be cleared. Additionally, because the iris area is generally occluded by eyelids and eyelashes, the occluded portion of the image should be eliminated before being used for identification. The removal of the noise and occlusion data is more difficult with non-cooperative images than cooperative images for a number of reasons. For one, the eyelids in frontal gaze images are assumed to be the horizontally strongest edges. Also, eyelid information exists on both sides of the iris area in these images. However, for non-cooperative iris images in which the eye can look in any direction, the shape of the eyelid changes. This change can cause mixing of the pupil and iris boundaries with eyelid information. Moreover, the assumption of having eyelid information on both sides of the iris area is not always true in non-cooperative images. Moreover, the environment is more homogeneous in cooperative image capture systems so the contrast of the image is higher. This contrast enables the eyelashes to be more easily distinguished inside the iris region. On the other hand, for non-cooperative images, the illumination is inconsistent. This factor coupled with movement of the eye makes the contrast in a frame of non-cooperative image data low. Thus, detection of the eyelashes is more challenging.

In order to separate noisy data inside the iris region from the iris pattern, a window based variance and intensity thresholding method is used. This method is based on the assumption that noisy data has more variance and edge information than the iris patterns and that the intensity of noise is either higher or lower than the iris patterns. The variance and intensity thresholding method uses a W×W window that is captured around a pixel (x,y) inside the iris region. The variance inside the window can be described as:

$$\sigma = \frac{1}{W^2} \sum_{i=-w'}^{w'} \sum_{j=w'}^{w'} (Im(x+i, y+j) - \mu)^2$$

where W is the size of the window, μ is the mean inside the window, and $$w' = \left\lfloor \frac{W}{2} \right\rfloor.$$

Figure 11:
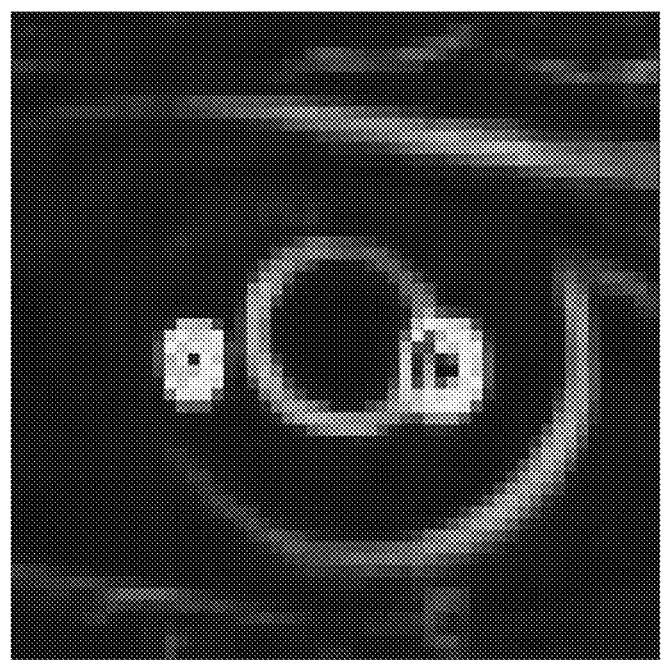
FIG. 11 is an output image generated from a window-based variance calculation.

The output of the window based variance calculation method can be seen in FIG. 11, where the bright regions represent the high variance areas. If the variance inside the window is larger than a threshold, which is adaptively calculated by using the previously detected pupil boundary's gradient values, than pixel (x,y) is classified as noise. Besides the variance, the edge information inside the window is also used for noise detection. The gradient of the original image has already formed for pupil detection as described above. The mean of the gradient inside the window is calculated, and if the value is larger than a threshold, then pixel (x,y) is classified as noise.

The mean intensity of the window is used in order to remove dark regions and bright regions inside the iris area. In order to calculate the threshold, the median intensity inside the detected iris region is calculated, and the lower threshold and upper threshold are calculated from the median intensity of the iris region. All the variance, edge and intensity thresholds are described as adaptive thresholds according to the contrast and intensity of the whole frame.

Figure 12:
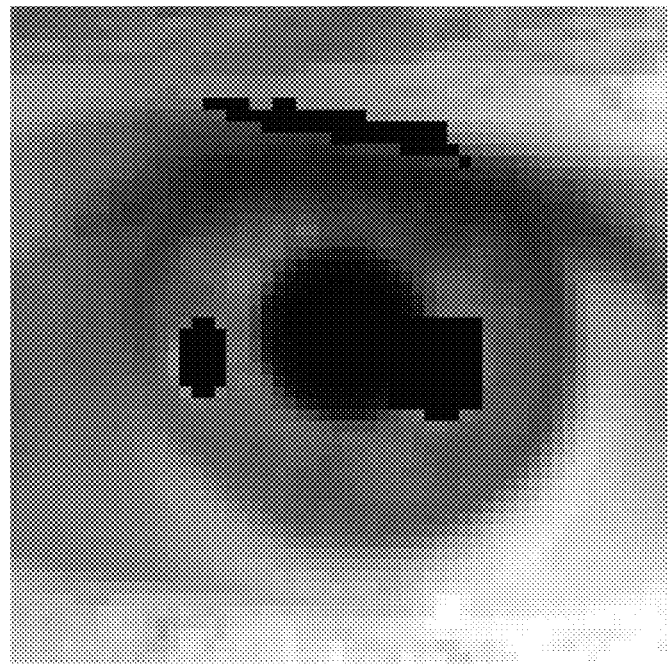
FIG. 12 is an output image generated from application of a noise mask to an original eye image.

As seen in FIG. 12, the noise cancellation method is also able to detect the eyelid boundaries because the eyelid boundaries exhibit high variance and low intensity. However, the method does not remove the eyelids because the eyelid areas are homogeneous. Eyelid boundaries need to be detected from the noisy data in order to remove the top part of the top eyelid and bottom part of the bottom eyelid. As previously mentioned, the edge information between the pupil boundary and the iris boundary may be used for detection of the eyelid boundary points. Applying a noise mask to the original image detects the eyelid boundaries, as shown in FIG. 12, because these boundaries exhibit high variance and low intensity. In order to detect the top eyelid boundary points, for each angle between 45° to 135°, the noisy data between the pupil and iris boundary are detected. For the bottom eyelid boundary points, the noise information between 225° to 315° is used.

Figure 13:
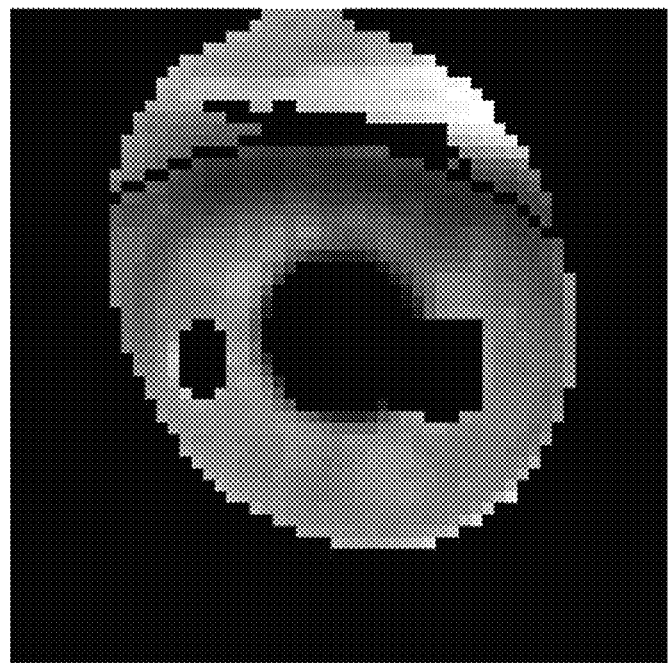
FIG. 13 is an image of the original image to which a noise mask has been applied and the eyelid top eyelid boundary between the pupil and the iris boundary is modeled as a second degree parabola.

After detecting the boundary points for the top and bottom eyelids separately, as shown in FIG. 13, a second degree polynomial is fitted to the top and bottom eyelid points, and the area above the top eyelid and below the bottom eyelid is classified as noise. These areas are added to the noise mask. Convex or concave constriction is applied to the second degree polynomial fitting in order to ensure the original shape of the top and bottom eyelids.

Figure 14:
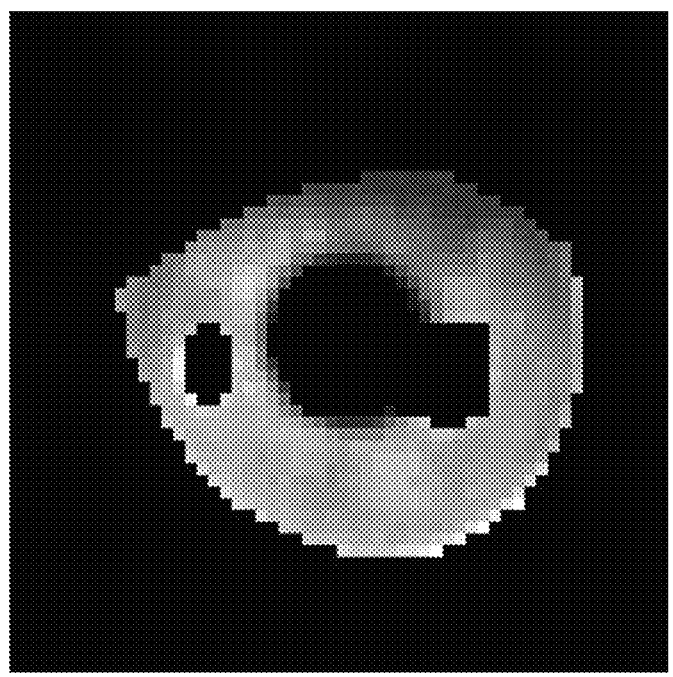
FIG. 14 is an image of a segmented iris obtained from a non-cooperative image after application of the noise mask.

Besides the iris segmentation, noise cancellation is also more challenging for non-cooperative iris images because the image capturing environment is heterogeneous and eye movement affects the iris image. The proposed noise cancellation method removes high variance, low intensity, and high intensity regions from the iris region by using a window based variance and intensity thresholding method. Then, eyelid boundaries are detected from the noise mask and modeled as a second degree polynomial with convex and concave restrictions corresponding to the top or bottom eyelid. As shown in FIG. 14, the iris region can be extracted and noisy information is removed accurately from a non-cooperative iris image.

In order to improve the efficiency of iris recognition systems using images captured in a non-cooperative environment, a method processes video images to eliminate bad quality frames and to assess the accuracy of segmented iris images generated from the processed frames. Thus, a typical iris recognition system 10, shown in FIG. 15, has been modified to include a quality filter 14 and a segmentation evaluation module 18. The system 10 includes an image acquisition system 20, an iris segmentation module 24, a feature extraction module 28, a template generator 30, and a matching module 34. These modules and their functions are well known. The addition of the quality filter 14 and the segmentation evaluation module 18 enable the system 10 to provide good quality and good segmented frames for the iris recognition performed by the system.

Figure 15:
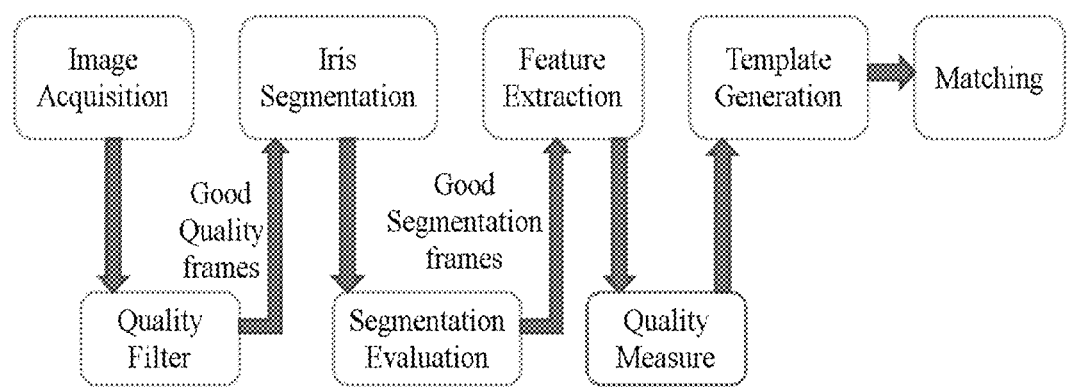
FIG. 15 is block diagram of a system that evaluates video frame quality and generates an iris segmentation score.

As shown in FIG. 15, the quality filter module 14 processes video frames captured by the image acquisition system 20. In non-ideal or non-cooperative video images, this module quickly detects and eliminates bad quality (e.g. closed eyes, interlaced frames, blurred images, motion blur) frames from further processing without segmentation. After iris segmentation, the segmentation evaluation module 18 assesses the pupil and limbic boundaries, as well as occluding features, such as eyelids and eyelashes.

There are a number of factors that affect iris image quality. These factors include the subject illumination, movement of the subjects, quality of the camera, out of focus conditions, closed eyes, as well as others. In the quality filter 14, the goal is to identify problematic images quickly and to eliminate the iris images that fail to possess sufficient quality for further processing, such as images without eyes, interlaced frames, severely blurred images, and motion blurred images. Previously known quality measure methods are applied to a single image, and most of them require iris segmentation before quality evaluation. Iris segmentation consumes significant processing resources, including time. In order to improve the efficiency and accuracy of iris recognition, poor quality images need to be detected quickly and eliminated before processing resources are expended on the images. In quality filter module 14, the quality of the incoming video frames is determined without requiring iris segmentation.

Figure 16:
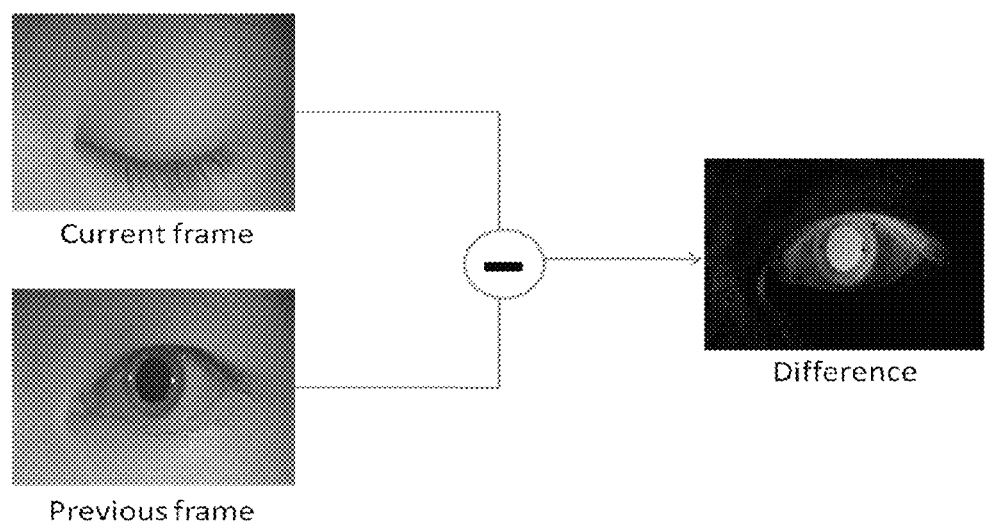
FIG. 16 is a differential comparison known in the prior art.

Eye tracking has been previously used to detect video frames that contain a blinking eye or those that have no eye image in them. Eye tracking includes calculating the difference image between two consecutive frames, using edge detection to find the region of interest, and object classification to detect if a valid eye is present. Such a method is shown in FIG. 16. This method works well with some well illuminated video frames, or with video frames that do not contain dramatic head movement. Application of this method to video frames obtained in a non-cooperative environment, however, yields lower detection accuracy. Finding a proper and adaptive threshold that is applicable to all kinds of illumination situations is very challenging. This challenge is exacerbated in uneven illumination situations.

Figure 17:
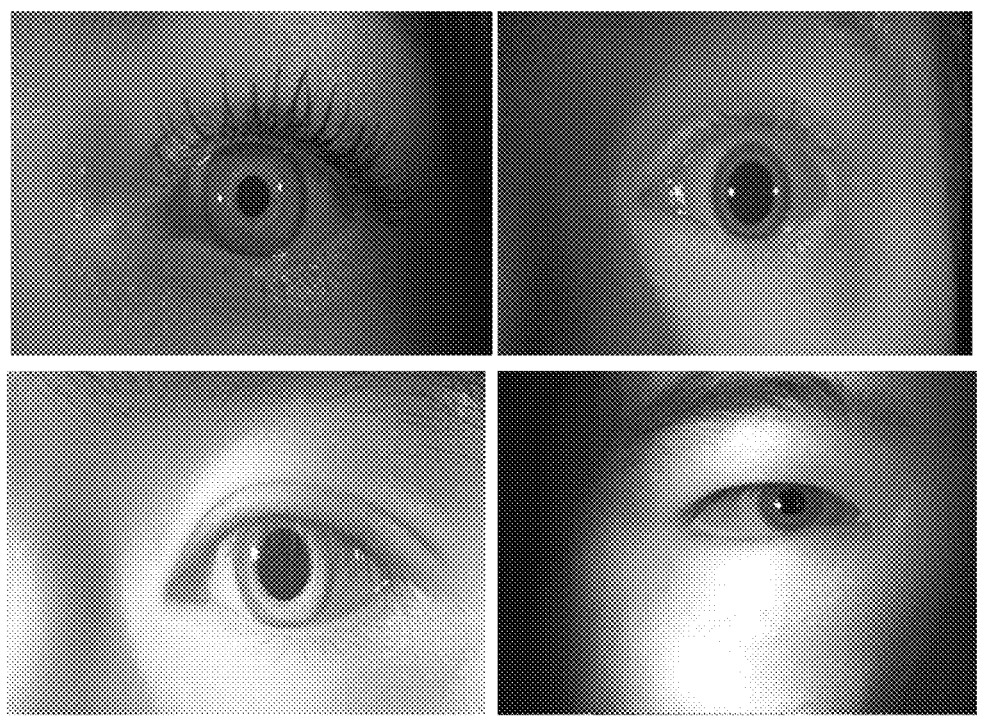
FIG. 17 shows examples of eye images with speculation.

The quality filter module 14 uses eye speculation as an indicator of the presence of a useful eye image in a frame. Eye speculation is shown in various eye images in FIG. 17. The speculation of an eye in an image is usually a small bright area, which can be detected to indicate the existence of an eye in the image. Previously known methods of iris image processing used speculation to select and localize an iris image within an image. These methods, however, require locating the pupil area in the image. Pupil area location is a component of iris segmentation. As noted above, the quality filter 14 enables frame quality evaluation to occur without iris segmentation processing. Thus, quality filter 14 simply detects the existence of speculation in an image as a measurement of the image quality.

Another problem detected by the quality filter 14 is an interlaced frame. In a video sequence, each frame represents a unique instance in time. In an interlaced frame, a single frame of video does not correspond to a single instant in time. Instead, half of the frame shows an object at one point in time and the other half of the frame shows the object at a later time in the sequence. FIG. 18A depicts an example of an interlaced frame obtain by combining a portion of an odd frame (FIG. 18B) with a portion of an even frame (FIG. 18C).

Quality filter 14 determines whether a frame is interlaced or not by calculating the correlation coefficient of the odd portion and the even portion in a frame.

$$\rho_{X,Y} = \frac{\text{cov}(X, Y)}{\sigma_X \sigma_Y} = \frac{E((X - \mu_X)(Y - \mu_Y))}{\sigma_X \sigma_Y},$$

where X and Y represent the frame with the odd portion and the frame with the even portion, respectively. E is the expected value operator and σ means covariance. Since the odd portion and the even portion in an interlaced frame are shown in two different points, the correlation coefficient scores in interlaced frames should be lower than non-interlaced frames. Detection of the lower coefficient score in a video sequence enables the quality filter module 14 to identify interlaced frames and remove them from the sequence so they do not undergo iris segmentation processing.

When acquiring iris images, movement of the eye and improper focus of the camera may cause blurriness in the acquired image. The three most frequent kinds of blurriness encountered are motion blur, out-of-focus blur, and a combination of motion blur and out-of-focus blur. To detect out-offocus blur, the quality filter module 14 smoothes an image with a blur filter, and compares the energy of the higher frequency image components with those of a clear image. Application of a blur filter suppresses the energy of the higher frequency components so the higher frequencies in the entire image are decreased. Modeling the defocus as a blurry process of the entire image works efficiently for focus assessment. The following spatial 8-by-8 filter is designed as a blur filter to extract the higher frequency component.

| -1 | -1 | -1 | -1 | -1 | -1 | -1 | -1 |
|----|----|----|----|----|----|----|----|
| -1 | -1 | -1 | -1 | -1 | -1 | -1 | -1 |
| -1 | -1 |  3 |  3 |  3 |  3 | -1 | -1 |
| -1 | -1 |  3 |  3 |  3 |  3 | -1 | -1 |
| -1 | -1 |  3 |  3 |  3 |  3 | -1 | -1 |
| -1 | -1 |  3 |  3 |  3 |  3 | -1 | -1 |
| -1 | -1 | -1 | -1 | -1 | -1 | -1 | -1 |
| -1 | -1 | -1 | -1 | -1 | -1 | -1 | -1 |

As explained above, the energy of the blur filtered image is compared with that of a clear image to detect out of focus blur. Similar to this idea, the summated focus score is passed through a compressive function:

$$f(x) = \frac{x^2}{x^2 + c^2},$$

where parameter c is the half-power of most clear frames, in order to generate a normalized focus score in the range of 0 to 1 for any frame. The highest score in the sequence of frames is selected for normalization. If the normalized score of the frame is lower than threshold T, the frame is classified as a blurred frame.

Illumination, however, causes the half-power to vary from one video sequence to another. More importantly, in a real-time situation, evaluation of the value of c from an entire sequence is impossible. To address this issue, quality filter module 14 updates the value sequentially. The on-line method for this updating is:

```
On-line algorithm to detect out-of-focus frame
Begin initialize c←0, T
    while not end of the sequence
        Convolute the video frame with high pass filter
        Calculate the sum of the square of the convolution result→x²
        if x > c then c = x
        f(x) ← x²/(x² + c²)
        if f(x) < T then it is a out-of-focus frame
        output out-of-focus frame numbers
    end
```

From this on-line method, each frame is convoluted with a high pass filter and the sum of the square of the convoluted frame is calculated as the focus score. Then the updated highest focus score is used as the parameter to normalize these scores from 0 to 1. T is used as the threshold to classify out of focus frames and clear frames.

Some motion blur images are also out-of-focus, most typically from head movement. This type of blurriness can be detected using an out-of-focus filter. If the motion blur is only in a small area with focus, such as occurs from eye movement, use of a simple out-of-focus filter may not be adequate. In order to detect this type of blurriness, the quality filter module 14 uses a modified Cepstral technique. To better understand the modified technique, the nature of motion blur is now discussed. Motion blur occurs when relative motion occurs between the camera and the object being captured. In linear motion blur, blur is in one direction. The motion blurred image is usually modeled as a convolution with a blurring kernel (or Point Spread Function, PSF) followed by noise addition.

$$g(x,y) = f(x,y) * h(x,y) + n(x,y),$$

where, $f(x,y)$ is the original image, $h(x,y)$ is the point-spread function, $n(x,y)$ is a noise function, and $g(x,y)$ is the degraded image. The method used to identify linear motion blur is to compute the two-dimensional spectrum of the blurred image $g(x,y)$. The point spread function for motion blur with a length of L and angle θ is given by $$h(x, y) = \frac{1}{L}\delta(\vec{L}),$$

where $\vec{L}$ is the line segment of length L oriented at an angle of θ degrees from the x-axis.

The Fourier transform of the function h(x, y), in the equation above, is a sinc function. Multiplying this sinc function by F(u, v) in the frequency domain preserves the ripples of the sinc function. To identify the ripples in G(u, v), the blur angle and blur length are estimated.

If the unmodified Cepstral method were used to identify linear motion blur, the two-dimensional response of the blurred image g(x,y) is computed as shown:

$$C\{g(x,y)\} = F^{-1}(\log|F^{-1}(g(x,y))|)$$

$$C\{g(x,y)\} = C\{f(x,y)\} + C\{h(x,y)\},$$

Figure 19A:
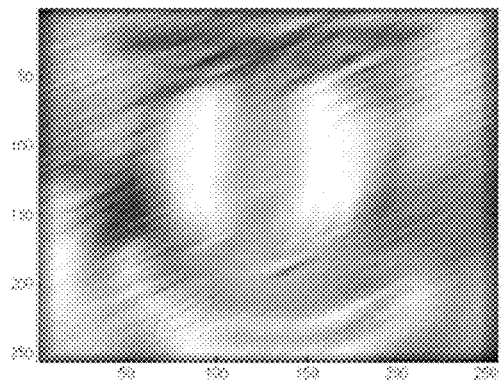
FIG. 19A shows an example of a blurred image and FIG. 19B depicts its spectrum.
Figure 19B:
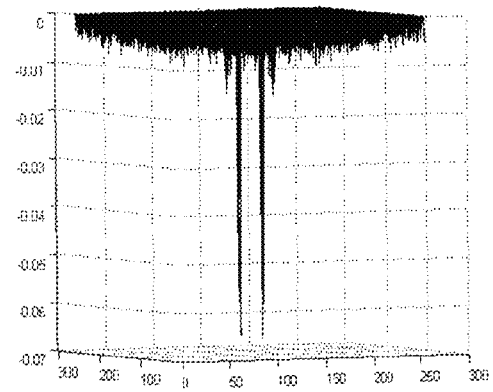

In this computation, the noise function is ignored. The Fourier transform of the point-spread function, H(x,y) is a sinc function with zeros. Thus, log(|H(x,y)|) has large negative spikes. In this way, the spikes may be used to identify the motion blur of an image. This method assumes that the entire image is corrupted with the same point-spread function. FIG. 19A shows an image that conforms to this assumption and FIG. 19B shows the spectrum of the blurred image with two prominent negative peaks.

Figure 20A:
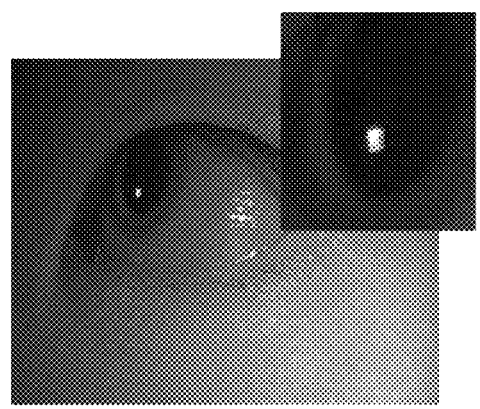
FIG. 20A shows an example of localized blurring in an image and FIG. 20B shows its spectrum.
Figure 20B:
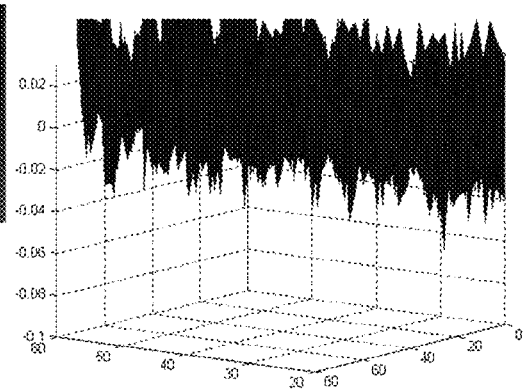

This assumption, however, does not always hold true in an iris image. When the subject's head is still and only the eye ball is moving, the captured image is not entirely blurred by the motion. In such a case, application of the Cepstral method to the entire image could not detect the motion blur. For example, FIG. 20B shows the spectrum of the entire image of FIG. 20A. As can be discerned from the figures, no clear negative spike of the image occurs.

Figure 21:
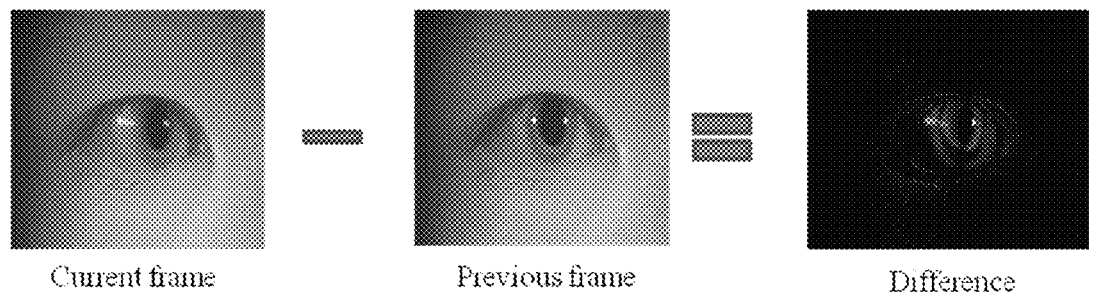
FIG. 21 shows a differential image being generated to locate a rough position for an iris region.
Figure 22:
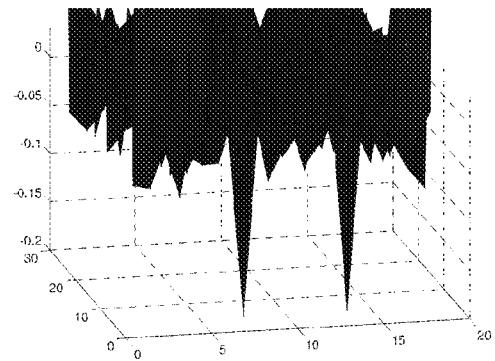
FIG. 22 shows the spectrum of the region of interest, where the negative spikes are obvious.
Figure 23A:
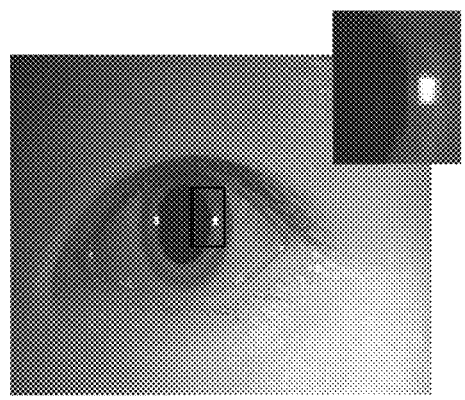
FIG. 23A shows a clear image of a glare area and FIG. 23B shows its spectrum.
Figure 23B:
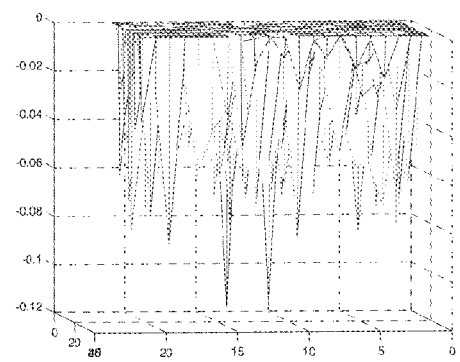

To overcome this limitation, this technique may be modified to compute a difference image between the current frame and the previous frame to roughly identify the iris area. This operation is depicted pictorially in FIG. 21. The difference image is thresholded to find the area with most change to define the region of interest, which is the iris. Then the Cepstral spectrum method is applied only to the region of interest. FIG. 22 shows the spectrum of the region of interest, where the negative spikes are obvious. Although this approach may work well with images that have been uniformly motion blurred by one PSF function, it could also confuse the local iris pattern with the PSF function in the frequency domain. As a result, some clear images, such as the one shown in FIG. 23A with the spectrum depicted in FIG. 23B, may be falsely assessed as possessing motion blur. Alternatively, some motion blurry iris images may be falsely accepted as clear images by this modified method. The short coming of this approach arises from the use of the PSF in the method.

Figure 24:
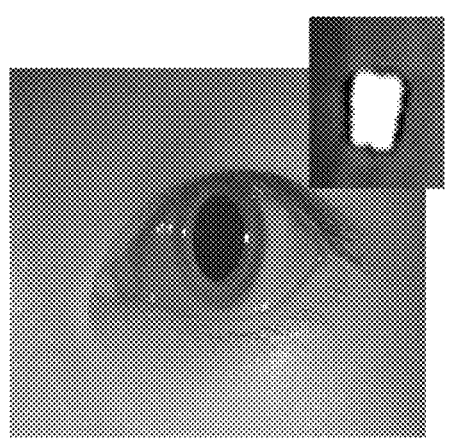
FIG. 24 shows a clear image and a depiction of a glare area in the image.
Figure 25:
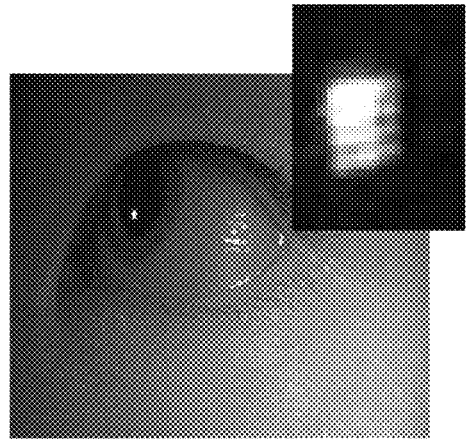
FIG. 25 shows a blurred image and a depiction of a glare area in the image.

To overcome this shortcoming of the Cepstral method, the quality filter module 14 uses glare area detection for local motion blur assessment. The glare area is the brightest area of an iris image. Glare inside a pupil or nearby a pupil area within a good quality image can be modeled as a bright object on a much darker background with sharp edges as shown in FIG. 24. Applying the motion blur process described above on glare in an image is equivalent to applying a low pass filter because the PSF is usually modeled as a matrix having 1 s. As a result, glare in a motion blurred image generates additional gray zones as shown in FIG. 25. Based on this model, the characteristics of glare may be used for motion blur detection in iris images.

Figure 26:
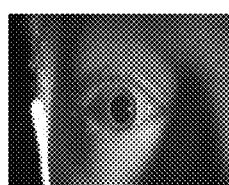
FIG. 26 shows a clear image with a glare area.
Figure 27:
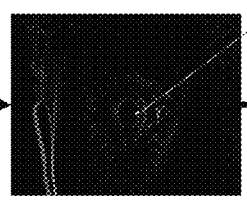
FIG. 27 shows the clear image of FIG. 26 after a horizontal Sorbel filter has been applied.
Figure 28:
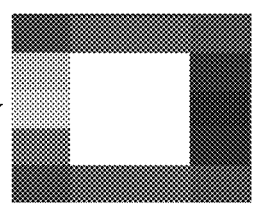
FIG. 28 is an enlargement of the glare area in FIG. 27.

While glare detection is useful, care must be taken in a non-cooperative image acquisition situation, because multiple areas may have very bright illumination and unwanted glare areas (glares that are not inside the eye ball). When a subject moves the eye, only the glare in the iris region may be used as a reference to detect iris local motion blur. For example, as shown in FIG. 26, the ear is very bright and glare areas are also near the cornea. These glare areas create challenges for glare detection. To meet this challenge, filter 14 applies a 3 by 3 Sobel filter to highlight wanted glare areas as shown in FIG. 27. An enlargement of the glare area in FIG. 27 is shown in FIG. 28. For a large bright area, such as the ear in FIG. 26, the Sobel filtering enables the inside area to cancel itself out and only the edges remain bright. For glares in unwanted areas, the local background is often brighter than the pupil or iris. Using the Sobel filter, such glares do not stand out as much as glare in the desired area.

Figure 29A:
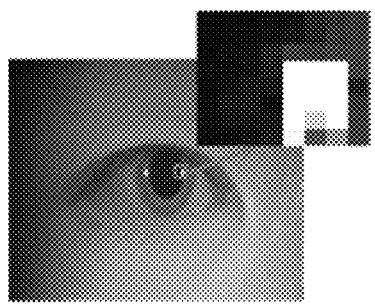
FIG. 29A is a clear eye image with a glare area and FIG. 29B is the glare area as a bright object obtained with one threshold and FIG. 29C is the glare area as a background object obtained with a second threshold.
Figure 29B:
Figure 29C:
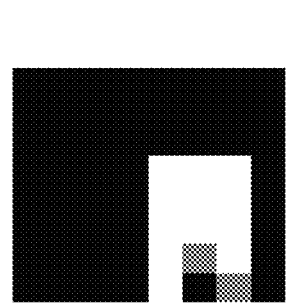
Figure 38:
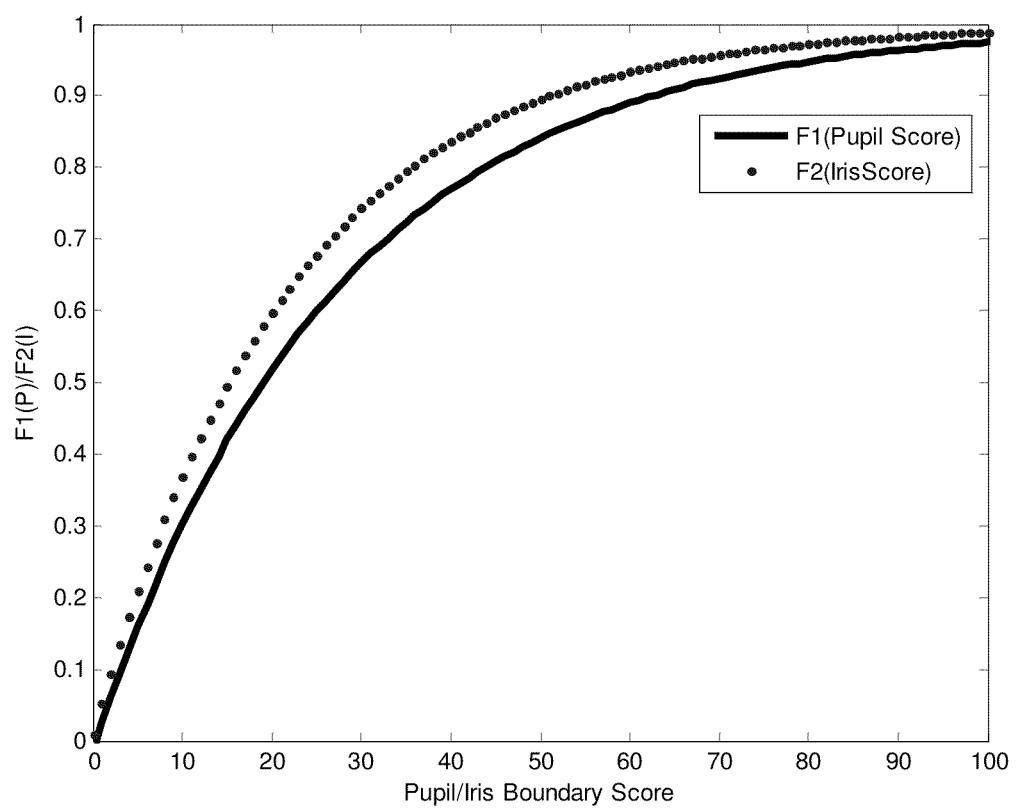
FIG. 38 is a plot of a pupil boundary score function and an iris boundary score function.

After applying a Sobel filter to an image, such as the one shown in FIG. 29, the brightest small area is the glare to be detected. This glare is selected with a background area of up to 8 by 8 pixels from the original image. As analyzed in a clear frame (FIG. 29A), the glare area can be modeled as two areas: a bright object, detected with a first threshold (FIG. 29B), and a dark background, detected with a second threshold (FIG. 29C). The glare area in a motion blurred frame, however, (FIG. 30A) includes three areas: a bright area (glare), which is detected with a first threshold (FIG. 30B), a gray area (gray area created by the motion blur process) and a dark area (background), which is detected with a second threshold (FIG. 30C). Thus, if the glare area can be segmented into three areas, then it is a motion blur image. Otherwise, the glare area indicates the image is clear. To implement this test in quality filter module 14, Otsu's thresholding method may be applied twice in the glare area to separate it into three parts.

Otsu's method assumes the image contains two classes of pixels and finds the optimum threshold separating the two classes so that their within-class variance is minimal. The first thresholding process separates the bright area from the dark area. The second thresholding process is applied to the bright area, which was segmented by the first threshold, to see if there is a gray area. If the image is a motion blurred image, the second thresholding finds a large amount of gray area. For example, FIG. 29A is a close-look of the glare from a clear image. FIG. 30A is a close-look of the glare from a motion blurred image. FIG. 29B and FIG. 30B are images resulting from the first thresholding of FIGS. 29A and 30A, respectively. Also, FIG. 29C and FIG. 30C are images resulting from the second thresholding of FIG. 29B and FIG. 30B, respectively. As can be observed, glare from a clear image has a gray area that is relatively small compared to the gray area of glare in a motion blurred image. Implementing this method in filter 14 enables the filter to detect motion blurred image frames in a video sequence.

In some cases, the glare may be on both the pupil and the iris area as shown in FIG. 30A. As demonstrated in the figures, this condition does not adversely impact the effectiveness of filter 14. Otsu's method finds the threshold that maximizes the between-class distance and minimizes the within-class distance. Thus, filter 14 still works in this situation because the glare is much brighter than the pupil and iris areas.

After the frames have been filtered to remove the ones having images that are not useful for iris segmentation, the remaining frames are subjected to the iris segmentation process and the segmented iris image is evaluated. This evaluation is important as some good quality images may not be segmented correctly. For example, many segmentation methods assume that pupil and limbic boundaries are circular, even though non-circular boundaries for these features in images are commonly acknowledged, even for images obtained in a cooperative environment. As a result, the segmentation process may not always achieve highly accurate results. Currently, a number of improvements have been made in iris image segmentation, but evaluation of the results is still important.

To evaluate iris segmentation accuracy, the center of the pupil, the pupil boundary, the outer iris boundary, which could include limbic boundaries, and the output mask from the segmentation processing are needed. These parameters are the standard outputs from the processing for iris image normalization, and polar transformation. Therefore, adding an evaluation step to the iris segmentation processing does not add additional burden for the iris recognition system. Using the center coordinates, a horizontal rectangle area, which includes the pupil, the iris, and the background, is cut as shown in FIG. 31. This cutting is formulated on the normal eye having three regions across the pupil center: the pupil area, the iris area, and the sclera. Each of these three regions has a different intensity due to different reflectance to NIR light. The iris segmentation evaluation module 18 selects a very narrow horizontal region across the pupil center for evaluation. A histogram of such an area is shown in FIG. 32A. From the large gap between the pupil and the iris's histograms, differences between adjacent elements of the histogram are calculated twice. The x value corresponding to the first negative value in the second difference (FIG. 32C) is the threshold for the pupil.

Comparing the segmented pupil boundary with the segmentation result, the accuracy of the center and the pupillary boundary can be determined efficiently. FIG. 33A and FIG. 34A reveal a comparison of a good segmentation result with a bad segmentation result. When the segmentation is correct (FIG. 33A), the mask from the segmentation (FIG. 33B) and the mask from the pupil boundary detection (FIG. 33C) match closely. Such is not the case, however, with a bad segmentation result as shown in FIG. 34B and FIG. 34C. From FIG. 33B and FIG. 33C and FIG. 34B and FIG. 34C, the observation can be made that if the pupil boundary is correct, the two masks should completely overlap. Hence, the similarities between the two masks are calculated as a measure of pupil boundary evaluation as follows:

$$P = \frac{\Sigma[(maskA = maskB])}{\text{Mask Area}}$$

In FIG. 33A, the pupil boundary evaluation score is P=91. Considering the glare in the pupil portion of the image, the segmentation is a good one. On the other hand, the evaluation score of the image in FIG. 34A is P=41, which indicates the segmentation is inaccurate.

In addition to the pupil center and boundary evaluation, the outer boundary of the iris region detection is also tested for accuracy. The iris boundary could include the limbic boundary, as well as the eyelid boundaries. The correct iris boundary should separate the iris from outside noise regions, such as eyelids, eyelashes, glare, and sclera. Compared to the noise regions, the iris region should be more homogeneous, and this characteristic may be used as a quality measurement if the iris boundary detection is accurate. A homogenous measure function useful to measure local homogeneity is:

$$FO_k(c) = \frac{\sum_{(d \in B_K(c) - B_{k-1}(c))} W(|f(c) - f(d)|)}{B_K(C) - B_{k-1}(c)},$$

where $B_K(c)$ is a ball of any radius k centered at c, $[B_K(c) - B_{k-1}(c)]$ is the number of pixels in $B_K(c) - B_{k-1}(c)$, $f(c)$ is the pixel value of the center, and $f(d)$ is the pixel value at location d. And W is the homogeneity function:

$$W(x) = e^{-\frac{x^2}{2\sigma^2}},$$
$$x > 0$$

The entire outer iris boundary may separate different regions. For example, the upper iris boundary may separate the upper eyelids from the iris; while the left/right iris boundary may separate the sclera from the iris. If the local homogeneous measure function was applied directly to the entire iris region, it could give incorrect results. Based on the observation of iris boundaries, the boundary is divided into four different regions: upper, lower, left, and right boundaries. For each region, 20 pixels are selected inside and outside of the detected iris boundary, respectively. The homogenous measure is then calculated:

$$FO_k(k) = \frac{\sum_{(d \in E(k))} W(|c - f(d)|)}{N(E(k))},$$

where, E(k) is the edge with $k^{th}$ pixel distance from the detected iris boundary, c is the estimated iris area pixel value, N is the function to count the number of pixels in E(k), and W is the homogenous function:

$$W(x) = e^{-\frac{x^2}{2\sigma^2}},$$

where σ is the standard deviation of the iris part offered by the segmentation result. Therefore, if a selected pixel is inside the iris, then the $W(|c-f(d)|)$ value would be high. If the edge is inside the iris, then FO(k) should be high. Otherwise, the value should be low. If the value of k is negative, then the edge is outside of the detection boundary. If the value of k is positive, then the edge is inside the boundary. If the detected iris boundary is correct, then the inside edges should have high values while outside edges should have lower values. In other words, by measuring the FO values of outer edges and inner edges, the accuracy of the detected boundary can be evaluated. This boundary accuracy is defined as:

$$g(i) = \left(1 - \frac{\sum_{k=-D}^{-1} FO_i(k)}{\sum_{k=-D}^{D} FO_i(k)}\right) \times 100,$$

where D is the biggest pixel distance selected in the calculation. In the segmentation evaluation module 18, D is set to a value of 20. Thus, if the detected boundary is correct, $$\sum_{k=-D}^{-1} FO_k$$

would be low to confirm that the accuracy is high. If the detected boundary has a smaller scale than the actual boundary, $$\sum_{k=-D}^{-1} FO_k$$

is still low, but $$\sum_{k=0}^{\frac{D}{2}} FO_k$$

is also low, which means the accuracy of the boundary is not good. Here, the boundary accuracy is redefined for checking the upper boundary as shown in FIG. 21.

$$g(i) = \left(1 - \frac{\sum_{k=-D}^{-1} FO_i(k)}{\sum_{k=-D}^{D} FO_i(k)}\right) \times \frac{\sum_{k=0}^{\frac{D}{2}} FO_i(k)}{\sum_{k=0}^{D} FO_i(k)} \times 100$$

FIG. 36B shows the plot of the FO function value using different iris boundaries for the upper boundary portion. FIG. 36B is a plot from a correctly detected iris boundary. The FO function is getting higher when approaching the inner boundary. FIG. 37B, on the other hand, shows that the FO function value is not low in the outer boundaries because the upper boundary, shown in FIG. 37A is lower than the correct position. The accuracy score for the upper boundary in FIG. 36A is: g(i)=98; and for the upper boundary in FIG. 37A is g(i)=21.

The iris boundary detection score of the entire iris boundary is the combination of the four parts. As is known, if any part of segmentation is wrong, the iris recognition accuracy may be adversely affected. Therefore, the accuracy of the entire iris boundary detection is calculated as the average accuracy score of the four regions:

$$I = \frac{\sum_{i=1}^{N} g(i)}{N}$$

The segmentation evaluation module 18 generates a composite score for each segmented image. The composite score includes: the pupil boundary score, the iris boundary score, and the image quality score, which may be expressed as:

$$SQ = F1(P) \cdot F2(I) \cdot Q,$$

Here the F1 and F2 functions normalize the pupil boundary score and iris boundary score from 0 to 1. Q is the quality score.

The relationship between available iris patterns and the iris recognition accuracy is more of an exponential relationship than a linear relationship. The F1 and F2 functions thus expressed are:

$$F1(P) = 1 - \kappa 1 e^{-\lambda 1 \left(\frac{P}{100} - 1\right)}$$

$$F2(I) = 1 - \kappa 2 e^{-\lambda 2 \left(\frac{I}{100} - 1\right)}$$

Since the error of the pupil boundary results in more penalty than the error of iris boundary, the two functions cannot be exactly the same. The rising slope of F1(P) should be steeper than F2(I). From empirical analysis, the following values have been derived, $\kappa 1 = 0.025$, $\lambda 1 = 3.7$, $\kappa 2 = 0.011$, and $\lambda 2 = 4.5$.

Using the implementations described above, a quality filter module 14 and a segmentation evaluation module 18 are coupled to an iris identification system as shown in FIG. 15. As video frames are received from the image acquisition system 20, the quality filter module 14 determines whether the frames are of suitable quality for iris segmentation processing. If they are, the frames are provided to the iris segmentation module 24. After the iris segmentation has been generated, the segmentation evaluation module 18 generates the scores regarding the accuracy of the pupil center, the pupil boundary, and the iris boundary. These scores are combined into a composite score to determine whether the iris segmentation is adequate for further processing in the identification system.

Those skilled in the art will recognize that numerous modifications can be made to the specific implementations described above. While the embodiments above have been described with reference to specific applications, embodiments addressing other applications may be developed without departing from the principles of the invention described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for segmenting an eye image to identify portions of the eye image containing iris pattern data comprising:
   receiving a frame of eye image data;
   convolving the eye image data with a predetermined matrix of coefficients to produce filtered eye image data, the predetermined matrix of coefficients being configured to produce peak points in the filtered eye image data at positions where glare is not present in the eye image data;
   comparing the filtered eye image data to a threshold;
   identifying a number of peak points in the filtered eye image data, the identified peak points in the filtered eye image data corresponding to positions of no glare in the eye image data; and
   segmenting the eye image data to identify portions of the frame containing iris pattern data only in response to at least one peak point being present in the filtered eye image data.

2. The method of claim 1, the segmenting of the eye image data further comprising:
   downsampling the frame of eye image data;
   clustering the eye image data in the downsampled frame of eye image data;
   calculating principal components and basis vectors for the clustered eye image data; and
   detecting whether the frame of eye image data contains a pupil image from the clustered eye image data, the principal components, and basis vectors.

3. The method of claim 2 further comprising:
   clustering subsequent frames of eye image data with reference to a calculated mean of clustered data, principal components, and basis vectors computed for a previous frame of eye image data in which a pupil was detected.

4. The method of claim 3 further comprising:
   identifying a segment in each frame of clustered eye image data corresponding to a glare area on the iris pattern data;
   removing the segment in each frame of clustered eye image data corresponding to the glare area from the clustered image data; and
   detecting an edge of a pupil with reference to a first cluster in the clustered image data to identify a pupil location and pupil radius in each frame.

5. The method of claim 4 further comprising:
   identifying a region of interest with reference to the pupil location and pupil radius;
   computing a gradient for the region of interest;
   identifying boundary points for the region of interest from the gradient; and
   fitting a conic shape to the boundary points with reference to the pupil location and pupil radius.

6. The method of claim 5, the conic shape being an ellipse.

7. The method of claim 5 further comprising:
   computing an intensity value for the region of interest;
   comparing the calculated intensity value to intensity values for adjacent regions;
   computing an intensity variance for the region of interest;
   comparing the intensity variance to a threshold; and
   identifying an iris boundary in response to the computed intensity being less than the intensity of the adjacent regions and the computed intensity variance being less than the threshold.

8. The method of claim 7 further comprising:
   generating an angular derivative of eye image data in the frame of eye image data;
   identifying iris boundary points from the angular derivative; and
   fitting a conic shape to the iris boundary points with reference to the pupil location and pupil radius to identify an iris boundary.

9. The method of claim 8, the conic shape being an ellipse.

10. The method of claim 8 further comprising:
    computing an iris center for a portion of the eye image data between the pupil boundary and the iris boundary;

computing a center for an area within the pupil boundary;
computing a distance between the iris center and the pupil center;
comparing the computed distance to a threshold; and
removing noise data from the area between the iris boundary and the pupil boundary in response to the computed distance being less than the threshold.

11. The method of claim 10, the noise data removal further comprising:
generating variance values for windows about pixels of eye image data between the iris boundary and the pupil boundary;
comparing the variance values to a threshold; and
removing pixels from an iris region between the iris boundary and the pupil boundary in response to the variance value for the window centered about the pixel being greater than the threshold.

12. The method of claim 11, the noise data removal further comprising:
computing a mean of a gradient for pixels within the windows centered about the pixels in the iris region;
comparing the computed mean to a threshold; and
removing pixels from an iris region in response to the computed gradient mean for the window centered about the pixel being greater than the threshold.

13. A method for evaluating quality in a non-cooperative iris image identification system comprising:
identifying regions of glare and motion blur in each frame of a plurality of frames in a video sequence of eye images, the detection of the regions of glare and motion blur further comprising:
applying a Sobel filter to image data in a frame;
identifying bright area pixels corresponding to the Sobel filtered image data exceeding a first threshold;
identifying gray area pixels in the Sobel filtered image data corresponding to the bright area pixels, the gray area pixels being less than a second threshold, the second threshold being greater than the first threshold;
identifying a quality score of the frame with reference to a first number of identified bright area pixels and a second number of identified gray area pixels;
discarding frames from the video sequence for segmentation processing in response to the identified number of gray area pixels being greater than a predetermined percentage of the bright area pixels for the frame;
generating a plurality of iris image segments with reference to frames of the video sequence for which the quality score is greater than the threshold;
generating a segmentation score for the plurality of iris segments, the generation of the segmentation score further comprising:
generating a pupil boundary segmentation score;
generating an iris boundary segmentation score
normalizing the pupil boundary segmentation score and the iris boundary segmentation score to produce the segmentation score; and
generating an overall score for an iris pattern in the frame used to identify a person with reference to a combination of the generated segmentation score and the identified quality score.

14. The method of claim 13, the identification of glare regions and motion blur regions in the video frames further comprising:
detecting interlaced frames in a video sequence.

15. The method of claim 14, the interlaced frame detection further comprising:
calculating correlation coefficients for portions of an image in a frame; and
comparing the correlation coefficients to a non-interlaced frame correlation coefficient.

16. The method of claim 13, the identification of glare regions and motion blur regions in the video frames further comprising:
detecting out of focus frames.

17. The method of claim 16, the out of focus frame detection further comprising:
convolving each frame with a high pass filter;
calculating a sum of squared error for the convolved frame; and
comparing the sum of squared error to a threshold.

18. The method of claim 13, the segmentation score generation further comprising:
evaluating a pupil center and pupil boundary in an iris segmentation.

19. The method of claim 18, the pupil center and pupil boundary evaluation further comprising:
comparing a pupil boundary mask to an iris segmentation mask to measure how well the pupil boundary mask matches the iris segmentation mask.

20. The method of claim 13, the segmentation score generation further comprising:
evaluating an iris boundary in an iris segmentation.

21. The method of claim 20, the iris boundary evaluation further comprising:
calculating a homogeneous measure for an iris boundary in an iris segmentation.

22. The method of claim 21, the homogeneous measure calculation further comprising:
calculating a homogeneous measure for different portions of an iris boundary in an iris segmentation.

23. The method of claim 22, the homogeneous measure calculation further comprising:
generating a composite homogeneous measure from the homogeneous measures calculated for the different iris boundary portions.

24. The method of claim 1 wherein the predetermined matrix of coefficients is:

$$H = \begin{bmatrix} -2 & -2 & -2 & -2 & -2 \\ -2 & 3 & 3 & 3 & -2 \\ -2 & 3 & 8 & 3 & -2 \\ -2 & 3 & 3 & 3 & -2 \\ -2 & -2 & -2 & -2 & -2 \end{bmatrix}.$$

* * * * *